United States Patent
Yasue et al.

(10) Patent No.: US 8,694,160 B2
(45) Date of Patent: Apr. 8, 2014

(54) NC MACHINE TOOL SYSTEM

(75) Inventors: Nobuyasu Yasue, Aichi Pref. (JP);
Hironobu Ishihara, Aichi Pref. (JP);
Kikuo Hattori, Aichi Pref. (JP);
Tsuyoshi Hattori, Aichi Pref. (JP)

(73) Assignee: Yamazaki Mazak Corporation,
Niwa-gun, Aichi Pref. (JP)

( * ) Notice: Subject to any disclaimer, the term of this patent is extended or adjusted under 35 U.S.C. 154(b) by 0 days.

(21) Appl. No.: 13/814,455

(22) PCT Filed: Aug. 24, 2011

(86) PCT No.: PCT/JP2011/069077
§ 371 (c)(1),
(2), (4) Date: Feb. 5, 2013

(87) PCT Pub. No.: WO2013/027283
PCT Pub. Date: Feb. 28, 2013

(65) Prior Publication Data
US 2014/0012420 A1    Jan. 9, 2014

(51) Int. Cl.
*G05B 19/04* (2006.01)
*G05B 19/18* (2006.01)
*G05B 19/00* (2006.01)
*G05B 17/00* (2006.01)

(52) U.S. Cl.
USPC ........... 700/253; 700/250; 700/255; 700/257; 700/264

(58) Field of Classification Search
None
See application file for complete search history.

(56) References Cited

U.S. PATENT DOCUMENTS

| | | | | |
|---|---|---|---|---|
| 4,146,924 A * | 3/1979 | Birk et al. | ...................... | 700/259 |
| 4,639,184 A * | 1/1987 | Knasel et al. | ................. | 414/730 |
| 4,972,347 A * | 11/1990 | Tarvin et al. | .................. | 700/186 |
| 4,975,856 A * | 12/1990 | Vold et al. | ..................... | 700/263 |
| 5,014,183 A * | 5/1991 | Carpenter et al. | ............. | 700/64 |
| 5,310,332 A | 5/1994 | Ito et al. | | |
| 5,587,937 A * | 12/1996 | Massie et al. | ..................... | 703/7 |
| 6,519,860 B1 * | 2/2003 | Bieg et al. | ........................ | 33/503 |
| 6,681,151 B1 * | 1/2004 | Weinzimmer et al. | ........ | 700/259 |
| 6,928,336 B2 * | 8/2005 | Peshkin et al. | ................ | 700/245 |

(Continued)

FOREIGN PATENT DOCUMENTS

| | | |
|---|---|---|
| JP | 63-289606 A | 11/1988 |
| JP | 04-128023 A | 4/1992 |

(Continued)

*Primary Examiner* — Khoi Tran
*Assistant Examiner* — Bao Long T Nguyen
(74) *Attorney, Agent, or Firm* — Marsh Fischmann & Breyfogle, LLP

(57) ABSTRACT

An NC machine tool system includes an NC machine tool (10), a first operation panel (22) and a second operation panel (24) for the NC machine tool, a multi-joint robot (40), a memory (450), and a robot controller (50). The multi-joint robot (40) is disposed above the NC machine tool. The memory (450) stores a wait position return program by which the multi-joint robot (40) is operated. The robot controller (50) controls the multi-joint robot (40) in accordance with the program. Operation panels (22, 24) are respectively provided with switch keys (22c, 24c) operated to execute the wait position return program stored in the memory (450) so as to operate the multi-joint robot (40).

8 Claims, 16 Drawing Sheets

(56) References Cited

U.S. PATENT DOCUMENTS

| | | | |
|---|---|---|---|
| 7,076,322 B2 * | 7/2006 | Chandhoke | 700/181 |
| 7,259,535 B1 * | 8/2007 | Pastusak et al. | 318/568.21 |
| 8,145,355 B2 * | 3/2012 | Danko | 700/251 |
| 2007/0164696 A1 * | 7/2007 | Henne | 318/568.13 |
| 2008/0255704 A1 * | 10/2008 | Braut | 700/264 |
| 2010/0070077 A1 * | 3/2010 | Le | 700/254 |
| 2010/0168950 A1 | 7/2010 | Nagano | |
| 2011/0073436 A1 | 3/2011 | Sueoka et al. | |

FOREIGN PATENT DOCUMENTS

| | | |
|---|---|---|
| JP | 05-200685 A | 8/1993 |
| JP | 05-301184 A | 11/1993 |
| JP | 6-2408 U | 1/1994 |
| JP | 2010-155328 A | 7/2010 |
| WO | WO2009144787 A1 | 12/2009 |

* cited by examiner

Fig.10

|  | Vicinity of the machine | Vicinity of the travel end | Apart from the machine and the travel end |  |
|---|---|---|---|---|
| Vicinity of the front fence | Pattern 5<br>Singular point checking<br>Checking of the J5 axis<br>Interference angle checking<br>Axis movement<br>Interference avoidance checking<br>Waiting position return | Pattern 9<br>Singular point checking<br>Checking of the J5 axis<br>Interference angle checking<br>Axis movement<br>Interference avoidance checking<br>Waiting position return | Pattern 13<br>Singular point checking<br>Checking of the J5 axis<br>Interference angle checking<br>Axis movement<br>Interference avoidance checking<br>Waiting position return | Vicinity of the pallet |
|  | Pattern 6<br>Singular point checking<br>Interference angle checking<br>Axis movement<br>Interference avoidance checking<br>Waiting position return | Pattern 10<br>Singular point checking<br>Interference angle checking<br>Axis movement<br>Interference avoidance checking<br>Waiting position return | Pattern 14<br>Singular point checking<br>Interference angle checking<br>Axis movement<br>Interference avoidance checking<br>Waiting position return | Apart from the pallet |
| Apart from the front fence | Pattern 7<br>Singular point checking<br>Checking of the J5 axis<br>Interference angle checking<br>Axis movement<br>Interference avoidance checking<br>Waiting position return | Pattern 11<br>Singular point checking<br>Checking of the J5 axis<br>Interference angle checking<br>Axis movement<br>Interference avoidance checking<br>Waiting position return | Pattern 15<br>Singular point checking<br>Checking of the J5 axis<br>Interference angle checking<br>Axis movement<br>Interference avoidance checking<br>Waiting position return | Vicinity of the pallet |
|  | Pattern 8<br>Axis movement<br>Interference avoidance checking<br>Waiting position return | Pattern 12<br>Axis movement<br>Interference avoidance checking<br>Waiting position return | Pattern 16<br>Interference avoidance checking<br>Waiting position return | Apart from the pallet |

NC MACHINE TOOL SYSTEM

FIELD OF THE INVENTION

The present invention relates to an NC machine tool system.

BACKGROUND OF THE INVENTION

Conventionally, multi-joint robots are made up of a plurality of rotation axes. This makes it significantly difficult for an operator to manually operate a multi-joint robot using a teaching box. Even if the operator is proficient in the operation, when some interfering substance exists around the multi-joint robot, the interfering substance might interfere with the multi-joint robot due to, if any, incorrect axis selection or an incorrect moving direction. In view of this, the operator gradually moves the multi-joint robot carefully, taking the optimal axis selection and the optimal moving direction into consideration. Thus, operating multi-joint robots is a significantly nerve-wracking kind of work for operators and a laborious kind of work. In view of this, in Japan, to be qualified to operate a multi-joint robot, one is required to attend a course prescribed by law and be granted a license.

General operators who lack experience of robot operation are unable to operate systematized multi-joint robots as accessories of NC machine tools. Thus, machine tools of this kind have not been widely employed except in some special cases where use of a multi-joint robot is inevitable.

Patent document 1 discloses an industrial robot provided with a plurality of switches corresponding to a plurality of respective operation programs. When a switch is pressed, the corresponding program is read, and the industrial robot executes the program. Patent document 2 discloses that operating an activation switch on a teaching pendant for a long period of time activates a robot in continuous operation mode, while operating the activation switch for a short period of time activates the robot in single block driving. Both patent documents give no consideration to operators who are not used to robot operation in systemized NC machine tools using multi-joint robots.

RELATED ART DOCUMENTS

Patent Documents

Patent Document 1: Japanese Unexamined Utility Model Application Publication No. 06-002408.
Patent Document 2: Japanese Unexamined Patent Application Publication No. 05-301184.

SUMMARY OF THE INVENTION

It is an object of the present invention to provide an NC machine tool system that is provided with a multi-joint robot and an NC machine tool and that ensures safe operation even for an operator who operates the multi-joint robot for the first time.

In order to accomplish the above-described object, according to a first embodiment of the present invention, an NC machine tool system includes an NC machine tool, an operation panel for the NC machine tool, a multi-joint robot disposed above the NC machine tool, program storing means for storing a program by which the multi-joint robot is operated, and a robot controller configured to control the multi-joint robot in accordance with the program. A waiting position of the multi-joint robot is set in the program. The program is one of a plurality of programs prepared in advance. The plurality of programs corresponding to positions of the multi-joint robot when switch means is turned on. The operation panel includes switch means configured to be operated to execute the program stored in the program storing means and to operate the multi-articular robot. One program among the plurality of programs is selected in accordance with a position and posture of the multi-articular robot when the switch means is turned on. The robot controller is configured to control the multi-joint robot to move along a moving path set in the selected program so as to return the multi-joint robot to the waiting position from a current position of the multi-joint robot.

In this configuration, when an operator operates the switch means of the operation panel, the program prepared in advance and stored in the program storing means is executed to operate the multi-joint robot. This ensures safe operation of the multi-joint robot even for an operator who operates the multi-joint robot for the first time. One program among the plurality of programs is selected in accordance with the position and posture of the multi-joint robot when the switch means is turned on. Along a moving path set in the selected program, the multi-joint robot moves to the waiting position from the current position of the multi-joint robot. This saves the operator the need to operate the multi-joint robot in accordance with the position and posture of the multi-joint robot.

Preferably in the NC machine tool system, a workpiece pallet is disposed at a side portion of the NC machine tool. The multi-articular robot is movable between the NC machine tool and the pallet. The pallet and the NC machine tool are surrounded by a safety fence. The robot controller is configured to move the multi-joint robot along the moving path set in the selected program while avoiding interference with the safety fence.

In this configuration, when the program is executed, the moving path of the multi-joint robot is selected in accordance with the position and posture of the multi-joint robot when the switch means is turned on, and the multi-joint robot moves and takes the target position and posture while avoiding interference with the safety fence. This saves the operator the need to operate the multi-joint robot while avoiding interference with the safety fence in accordance with the position and posture of the multi-joint robot.

Preferably in the NC machine tool system, the operation panel includes a first operation panel disposed in a vicinity of the NC machine tool, and a second operation panel disposed in a vicinity of the pallet. The first and second operation panels each include the switch means to be operated so as to execute the program.

In this configuration, when the multi-joint robot is positioned in the vicinity of the NC machine tool, operating the switch means of the first operation panel, which is in the vicinity of the NC machine tool, ensures that the program is executed. When the multi-joint robot is positioned in the vicinity of the pallet, operating the switch means of the second operation panel, which is in the vicinity of the pallet, ensures that the program is executed.

Preferably in the NC machine tool system, the program is set on a rectangular coordinate system used for the NC machine tool.

In this configuration, the program is executed on a rectangular coordinate system used for the NC machine tool. This facilitates understanding of how to operate the multi-joint robot for an operator used to operating the NC machine tool.

BRIEF DESCRIPTION OF THE DRAWINGS

FIG. 10 shows the relation between pattern 5 to 16 processes and the vicinity of the front fence, a position away from the front fence, the vicinity of the machine, the vicinity of a travel end, and a position away from the machine and the travel end.

DETAILED DESCRIPTION OF THE PREFERRED EMBODIMENTS

An NC machine tool system according to one embodiment of the present invention will be described by referring to FIGS. 1 to 17.

Figure 1:
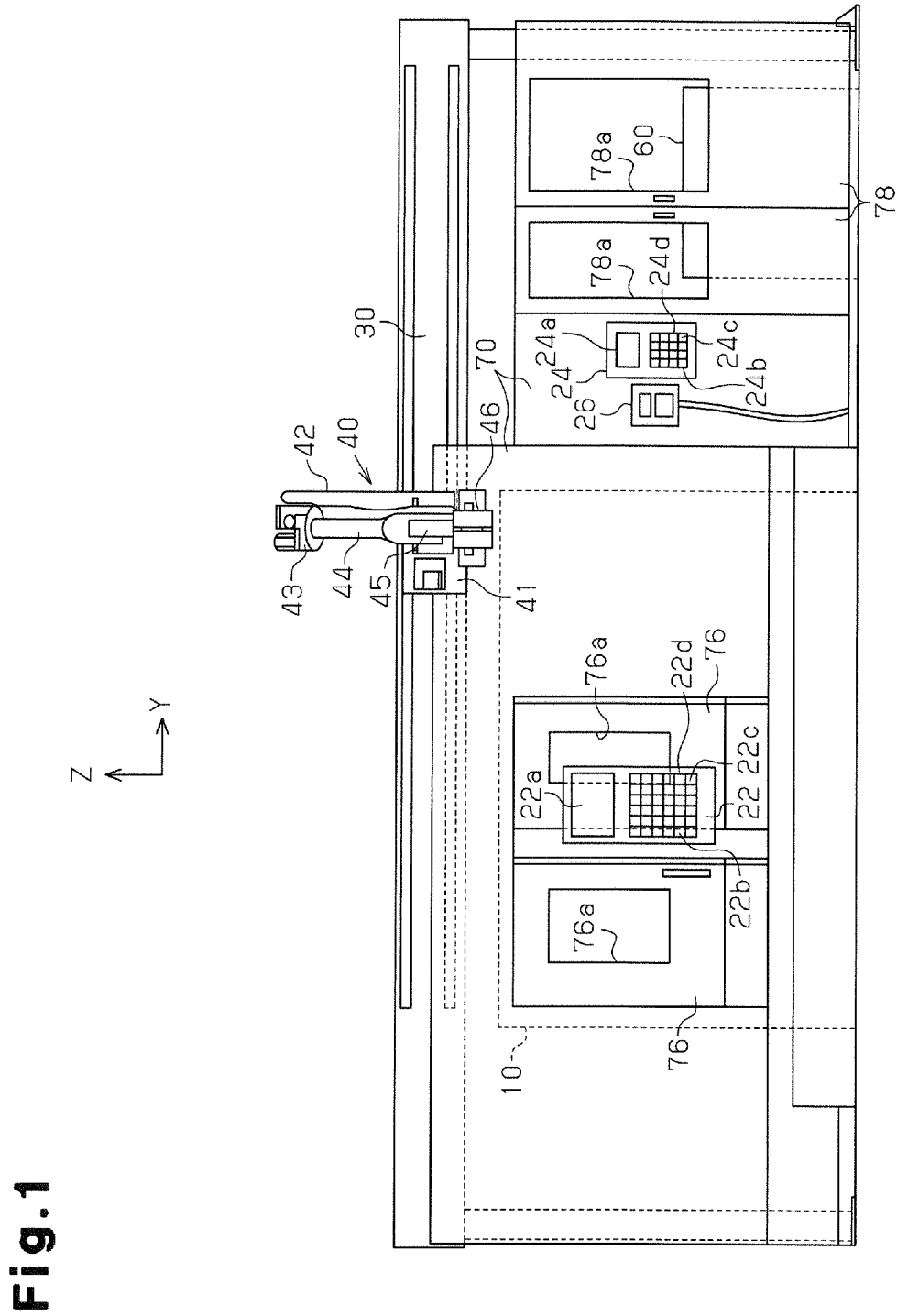
FIG. 1 is a front view of an NC machine tool system according to an embodiment of the present invention.
Figure 4:
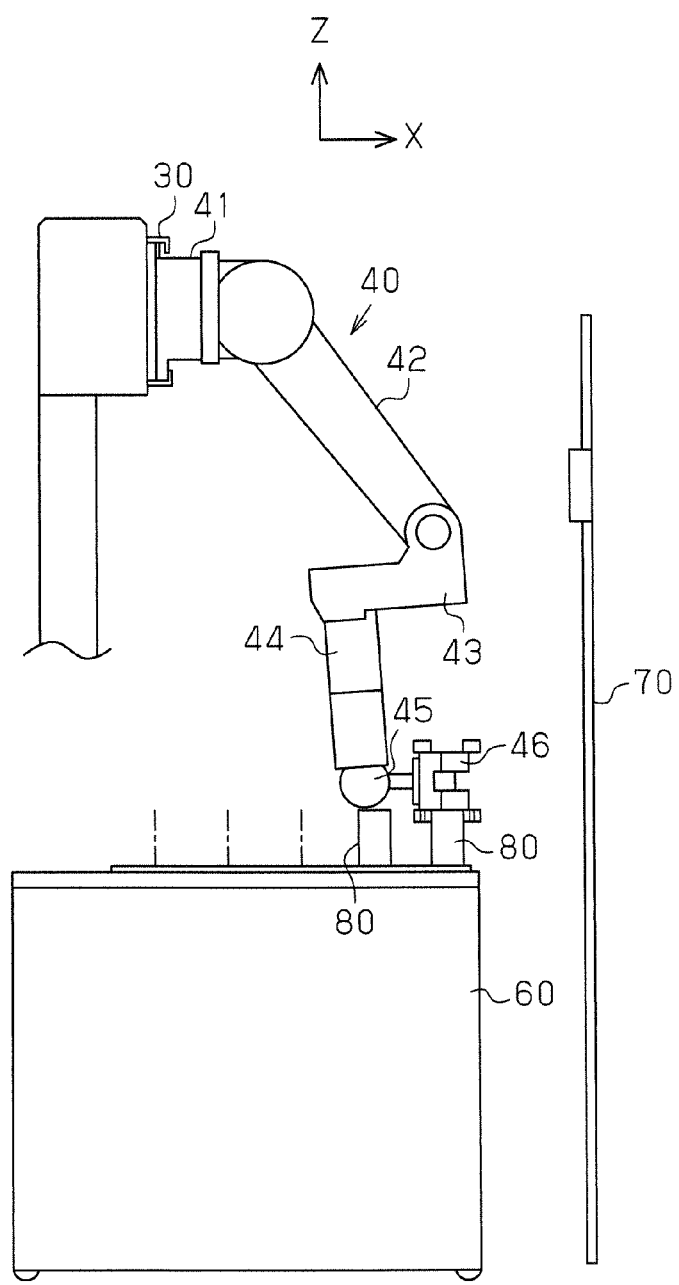
FIG. 4 is a side view of the multi-joint robot moved above a pallet.
Figure 5:
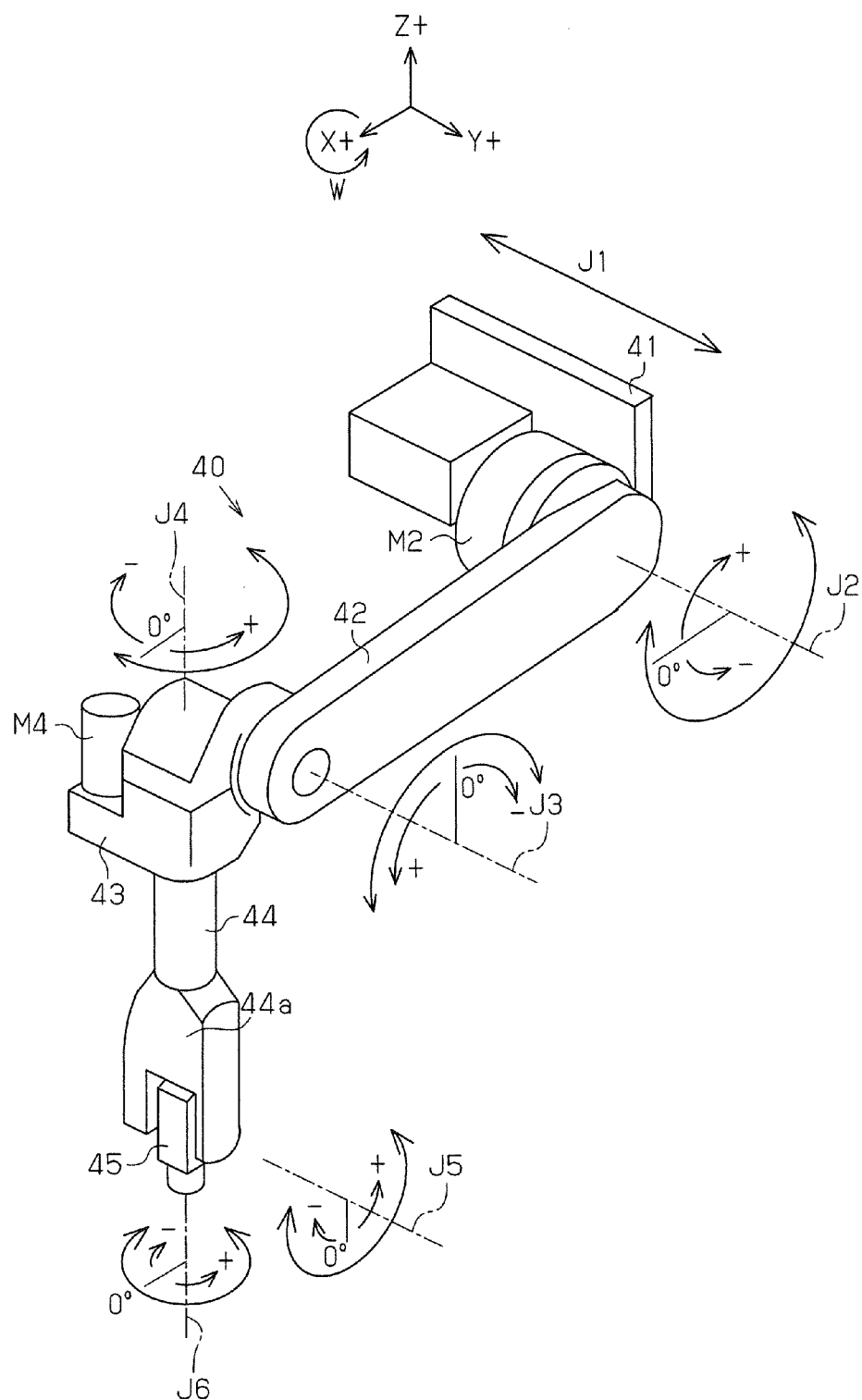
FIG. 5 is a perspective view of the multi-joint robot.
Figure 6:
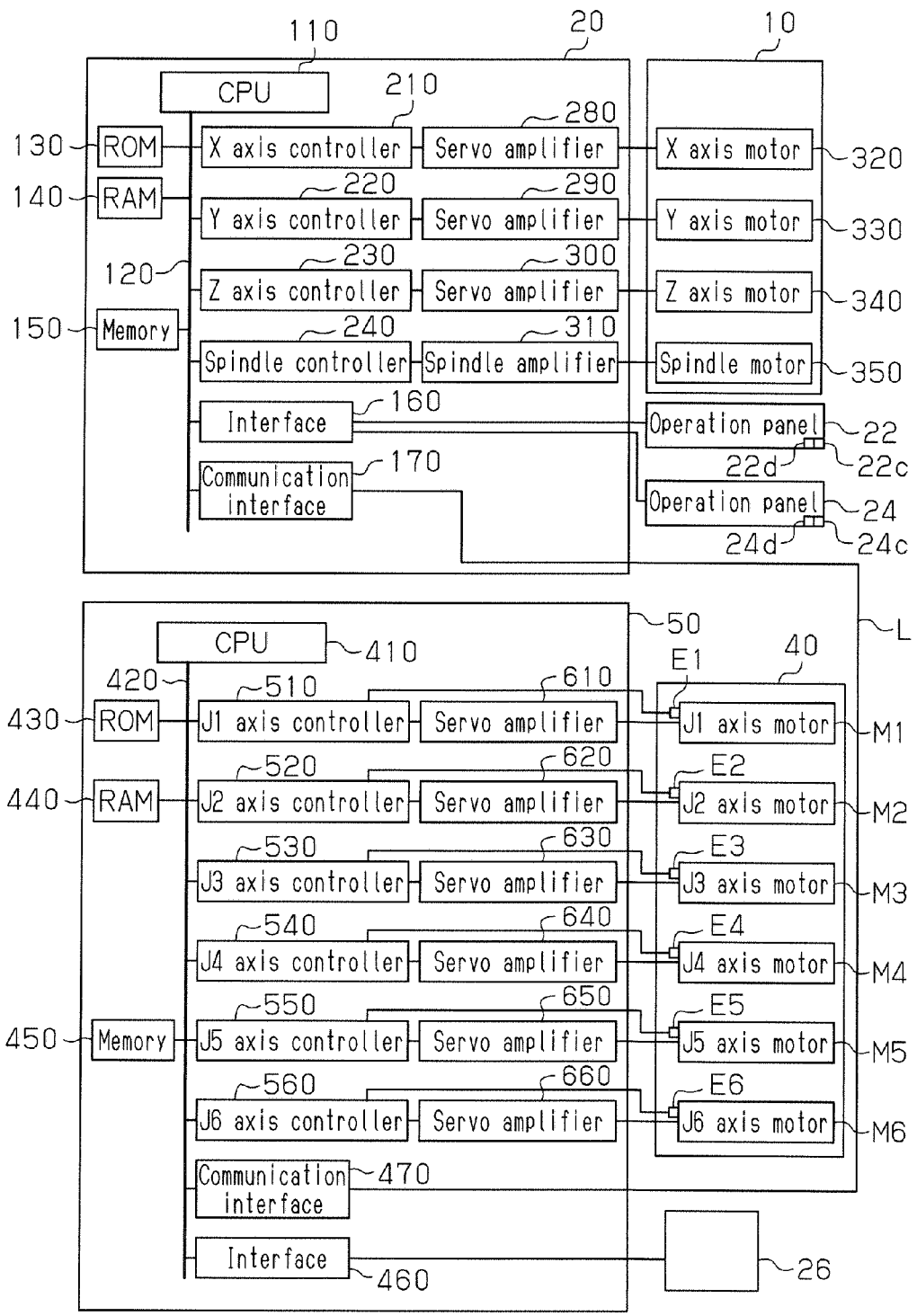
FIG. 6 is a block diagram of the system.

As shown in FIGS. 1 and 6, the NC machine tool system includes an NC machine tool 10, an NC controller 20 that controls the NC machine tool 10, a multi-joint robot 40, and a robot controller 50 that controls the multi-joint robot 40. The multi-joint robot 40 travels on a gantry rail 30 disposed above the NC machine tool 10. The NC machine tool 10 is a horizontally opposed double spindle multi-tasking lathe. On the right side in FIG. 1, a workpiece loading and unloading pallet 60 is disposed next to the NC machine tool 10. The gantry rail 30 extends over the NC machine tool 10 and the pallet 60. In this embodiment, on the front view of the NC machine tool 10 shown in FIGS. 1 and 2, the vertical direction, the front-rear direction, and the lateral direction will be respectively assumed to be the Z-axis direction, the X-axis direction, and the Y-axis direction. As shown in FIGS. 1 to 5, the +X-axis direction is the frontward direction, the +Y-axis direction is the right direction, and the +Z-axis direction is the upward direction.

On a bed 10a of the NC machine tool 10, a first headstock 10b and a second headstock 10c are disposed. On the first headstock 10b, a spindle head 10d is disposed. The spindle head 10d includes a chuck 10f that holds a workpiece. On the second headstock 10c, a spindle head 10e is disposed. The spindle head 10e includes a chuck 10g that holds a workpiece. The NC machine tool 10 includes a tool spindle unit 10h. The tool spindle unit 10h is supported by a column and a saddle. The column is movable in the X-axis direction relative to a base. The base is movable in the Y-axis direction. The saddle is movable in the Z-axis direction relative to the column.

The column is moved in the X-axis direction by an X axis motor 320 shown in FIG. 6. The column is also moved in the Y-axis direction by the base driven by the Y axis motor 330. The saddle is driven by a Z axis motor 340 shown in FIG. 6 to also move in the Z-axis direction. To the tool spindle unit 10h, a machining tool 10j is attached.

As shown in FIG. 5, the multi-joint robot 40 includes six axes (J1 to J6 axes). The multi-joint robot 40 includes a robot base 41 that moves along the J1 axis, which corresponds to the horizontal direction. The robot base 41 is movable relative to the gantry rail 30 along the longitudinal direction of the gantry rail 30. The robot base 41 is provided with a rail driving device of rack-and-pinion type. The rail driving device includes a J1 axis motor M1 shown in FIG. 6. A pinion disposed on the output shaft of the J1 axis motor M1 meshes with a rack of the gantry rail 30. This ensures that when the J1 axis motor M1 is driven, the robot base 41 moves between a right travel end RE and a left travel end LE of the gantry rail 30 shown in FIG. 2. The J1 axis is a traveling axis.

The robot base 41 is coupled with a J2 axis arm 42. The J2 axis arm 42 swings about the J2 axis, which is parallel to the J1 axis. The J2 axis arm 42 swings by a reducer-equipped J2 axis motor M2 disposed on the robot base 41. The J2 axis arm 42 is coupled with, at its distal end, a J3 axis casing 43 that swings about the J3 axis, which is parallel to the J2 axis. The J3 axis casing 43 is turned into swinging movement by a reducer-equipped J3 axis motor M3 disposed in the J3 axis casing 43.

The J3 axis casing 43 is coupled with, at its distal end, a J3 axis arm 44 that rotates about the J4 axis, which is orthogonal to the J3 axis. The J3 axis arm 44 is turned into rotation by a reducer-equipped J4 axis motor M4 disposed in the J3 axis casing 43. The J3 axis arm 44 is coupled with, at its distal end, a J6 axis unit 45 that swings about the J5 axis, which is orthogonal to the J4 axis. The J6 axis unit 45 is turned into swinging movement by a reducer-equipped J5 axis motor M5 disposed in the J3 axis arm 44 and shown in FIG. 6. As shown in FIGS. 4 and 5, the J6 axis unit 45 has its distal end portion rotate about the J6 axis, which is orthogonal to the J5 axis. The distal end portion of the J6 axis unit 45 is turned into rotation by a reducer-equipped J6 axis motor M6 disposed in the J6 axis unit 45. To the distal end portion of the J6 axis unit 45, a robot hand 46 is coupled.

Figure 11:
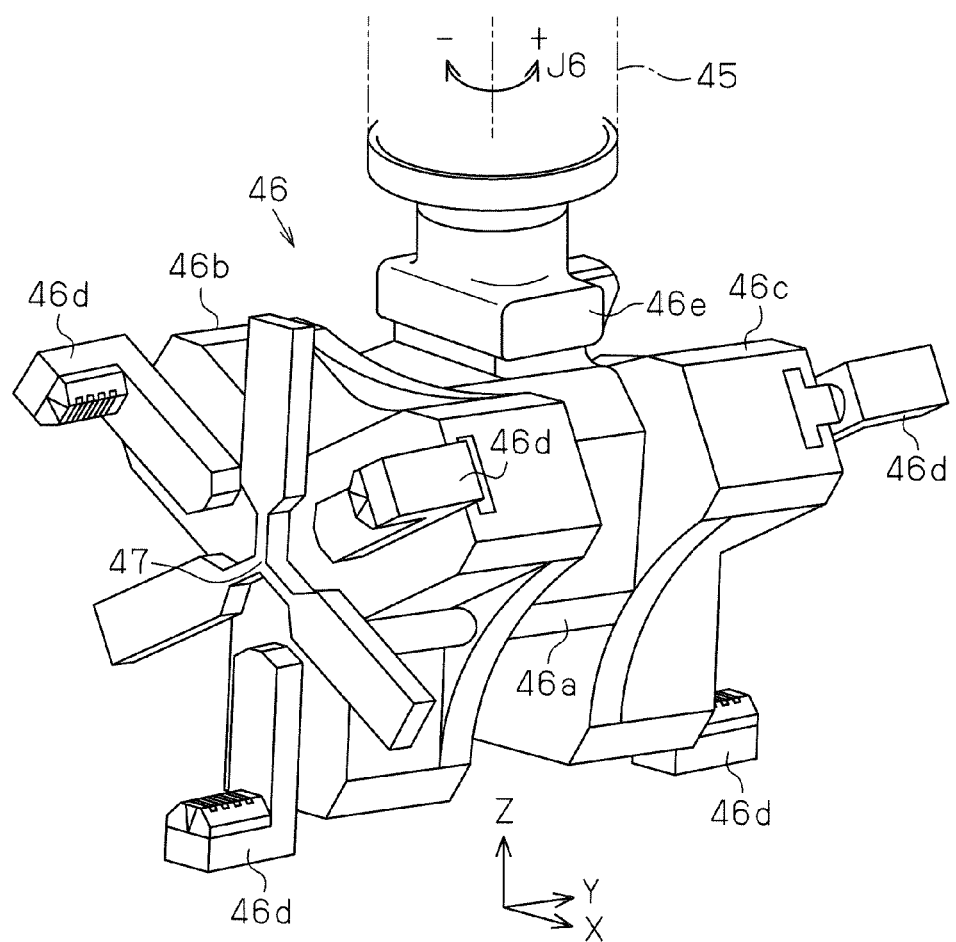
FIG. 11 is a perspective view of a robot hand.

As shown in FIG. 11, the robot hand 46 is secured to the J6 axis unit 45 through a base 46a. The base 46a has a pair of opposing end surfaces. A loading hand 46b is secured to one of the end surfaces, while an unloading hand 46c is secured to the other end surface. The loading hand 46b and the unloading hand 46c each include a plurality of jaws 46d. The jaws 46d are turned into operation to grip a work piece 80 and release gripping of the work piece 80. The J2 to J6 axes are pivot axes.

As shown in FIG. 5, when the J2 axis arm 42 is oriented in the horizontal, +X direction, the rotation angle about the J2 axis is assumed to be zero degrees. The rotation angle of the J2 axis arm 42 in the upward direction from zero degrees is assumed to be positive "+", while the rotation angle in the downward direction is assumed to be negative "−". When the J3 axis arm 44 is oriented vertically downward (−Z direction), the rotation angle is assumed to be +180 degrees. That is, when the J3 axis arm 44 is oriented vertically upward (+Z direction), the rotation angle is zero degrees. The rotation angle of the J3 axis arm 44 about the J3 axis in the forward direction from zero degrees is assumed to be positive "+", while the rotation angle about the J3 axis in the rearward direction is assumed to be negative "−". When a reference surface 44a of the J3 axis arm 44 is oriented in the +X direction, the rotation angle about the J4 axis is assumed to be zero degrees. When the reference surface 44a of the J3 axis arm 44 is oriented in the +Y direction from the zero degree position, the rotation angle about the J4 axis is assumed to be positive "+", while the rotation angle about the J4 axis in the −Y direction is assumed to be negative "−". When the J6 axis unit 45 is aligned with the J3 axis arm 44, the rotation angle about the J5 axis is assumed to be zero degrees. When the J6 axis unit 45 rotates in one direction (the forward direction in FIG. 5) from zero degrees, the rotation angle about the J5 axis is assumed to be negative "−", while the rotation angle about the J5 axis in the opposite direction (the rearward direction in FIG. 5) is assumed to be positive "+".

As shown in FIG. 11, when a reference surface 46e of the robot hand 46 mounted to the J6 axis unit 45 is oriented in the same direction as the direction in which the reference surface 44a of the J3 axis arm 44 is oriented, the rotation angle about the J6 axis is assumed to be zero degrees. That is, this state corresponds to the loading hand 46b and the unloading hand 46c being in horizontal state and aligned along the Y axis. When the reference surface 46e of the robot hand 46 is oriented in the +Y direction from zero degrees, the rotation angle about the J6 axis is assumed to be positive "+", while the rotation angle about the J6 axis in the −Y direction is assumed to be negative "−". The robot hand 46 grips a work piece 80 on the pallet 60 and loads the work piece 80 to the NC machine tool 10. When the NC machine tool 10 finishes machining of the work piece 80, the robot hand 46 unloads the work piece 80 onto the pallet 60.

As shown in FIGS. 1 to 4, a front fence 70, side fences 72, and a rear fence 74 are disposed around the NC machine tool 10 and the pallet 60 to serve as safety fences. On the front fence 70, openable and closable doors 76 and 78 are disposed. The doors 76 and 78 respectively correspond to the NC machine tool 10 and the pallet 60. The doors 76 and 78 respectively include windows 76a and 78a. A first operation panel 22 is disposed on the front fence 70 in the vicinity of the windows 76a, which correspond to the NC machine tool 10. A second operation panel 24 is disposed in the vicinity of the windows 78a, which correspond to the pallet 60. The first operation panel 22 and the second operation panel 24 each correspond to the operation panel for the NC machine tool. A teaching box 26 is disposed in the vicinity of the windows 78a. The teaching box 26 is electrically coupled to the robot controller 50 shown in FIG. 6.

Next, an electrical configuration of the NC machine tool system will be described by referring to FIG. 6.

As shown in FIG. 6, the NC controller 20 includes a CPU (Central Processing Unit) 110 in charge of overall control of the NC controller 20. Through a bus line 120, the CPU 110 is coupled with, for example, a ROM 130, a RAM 140, a memory 150, an interface 160, a communication interface 170, an X axis controller 210, a Y axis controller 220, a Z axis controller 230, and a spindle controller 240. The ROM 130 stores various system programs for overall control of the NC controller 20. The RAM 140 stores, for example, temporary calculation data and display data, and various other data input by an operator through the first operation panel 22 and the second operation panel 24.

The interface 160 is coupled with the first operation panel 22 and the second operation panel 24. The first operation panel 22 and the second operation panel 24 respectively include display devices 22a and 24a and keyboards 22b and 24b for data input. As shown in FIGS. 1 and 6, the keyboards 22b and 24b respectively include switch keys 22c and 24c operated when the multi-joint robot 40 is returned to its waiting position, and buttons 22d and 24d operated when the multi-joint robot 40 is moved upward. The switch keys 22c and 24c and the buttons 22d and 24d each correspond to the switch means.

The X axis controller 210 receives a position control command associated with the X axis from the CPU 110 and outputs the position control command to a servo amplifier 280. Based on the position control command, the servo amplifier 280 drives the X axis motor 320 to move the column in the X-axis direction. The Y axis controller 220 receives a position control command associated with the Y axis from the CPU 110 and outputs the position control command to a servo amplifier 290. Based on the position control command, the servo amplifier 290 drives the Y axis motor 330 to move the column in the Y-axis direction. The Z axis controller 230 receives a position control command associated with the Z axis from the CPU 110 and outputs the position control command to a servo amplifier 300. Based on the position control command, the servo amplifier 300 drives the Z axis motor 340 to move the saddle in the Z-axis direction.

The spindle controller 240 receives a spindle rotation control command from the CPU 110 and outputs a spindle speed signal to a spindle amplifier 310. Based on the spindle speed signal, the spindle amplifier 310 rotates a spindle motor 350 at a spindle rotational frequency as commanded and drives the machining tool 10j. The communication interface 170 is communicative with the robot controller 50 through a communication line L. The X axis motor 320, the Y axis motor 330, the Z axis motor 340, and the spindle motor 350 each include a servo motor.

Next, the robot controller 50 will be described.

The robot controller 50 includes a CPU 410. Through a bus line 420, the CPU 410 is coupled with, for example, a ROM 430, a RAM 440, a memory 450, an interface 460, a communication interface 470, a J1 axis controller 510, a J2 axis controller 520, a J3 axis controller 530, a J4 axis controller 540, a J5 axis controller 550, and J6 axis controller 560.

The ROM 430 stores a control program for the operational control of the robot, and data as to conditions for the control. The RAM 440 stores a teaching program of the multi-joint robot 40. The RAM 440 is used as a working area of the CPU 410. The RAM 440 temporarily stores data under calculation. The memory 450 includes, for example, a hard disc or a nonvolatile semiconductor memory. The memory 450 stores teaching data. The teaching data is taught for the multi-joint robot 40 by manual control and read at the execution of the teaching program. The memory 450 stores awaiting position return program. The memory 450 corresponds to the program storing means. The waiting position return program is set to operate on a rectangular coordinate system of the X axis, the Y axis, and the Z axis. The rectangular coordinate system of the X axis, the Y axis, and the Z axis is a rectangular coordinate system used for the NC machine tool.

Known coordinate systems are used for a base coordinate system with any point on the robot base 41 of the multi-joint robot 40 taken as a base point, for coordinate systems of the respective arms with base points of the arms taken as the origins, and for tool coordinate systems with any point at which the robot hand 46 is attached taken as the origin. Thus, homogeneous transformation matrices obtained from known data are used to convert the various commands written in the waiting position return program using rectangular coordinate systems of the X axis, the Y axis, and the Z axis into commands on the respective coordinate systems. Then, the commands are output to the corresponding axis controllers. The interface 460 is coupled with the teaching box 26, which is used for input of teaching data of the multi-joint robot 40 and for manual control thereof.

The J1 to J6 axis controllers 510 to 560 are respectively coupled to servo amplifiers 610 to 660. The J1 to J6 axis controllers 510 to 560 execute feedback control of their respective servo amplifiers based on a rotation control command from the CPU 410 and based on current position information (current rotation angle) from rotary encoders E1 to E6 of the respective J1 to J6 axis motors M1 to M6. The J1 to J6 axis motors M1 to M6 each include a servo motor. The servo amplifiers 610 to 660 drive their respective J1 to J6 axis motors M1 to M6 based on commands from the respective J1 to J6 axis controllers 510 to 560 so as to move the robot hand 46. The communication interface 470 is communicative with the NC controller 20 through the communication line L.

Figure 8:
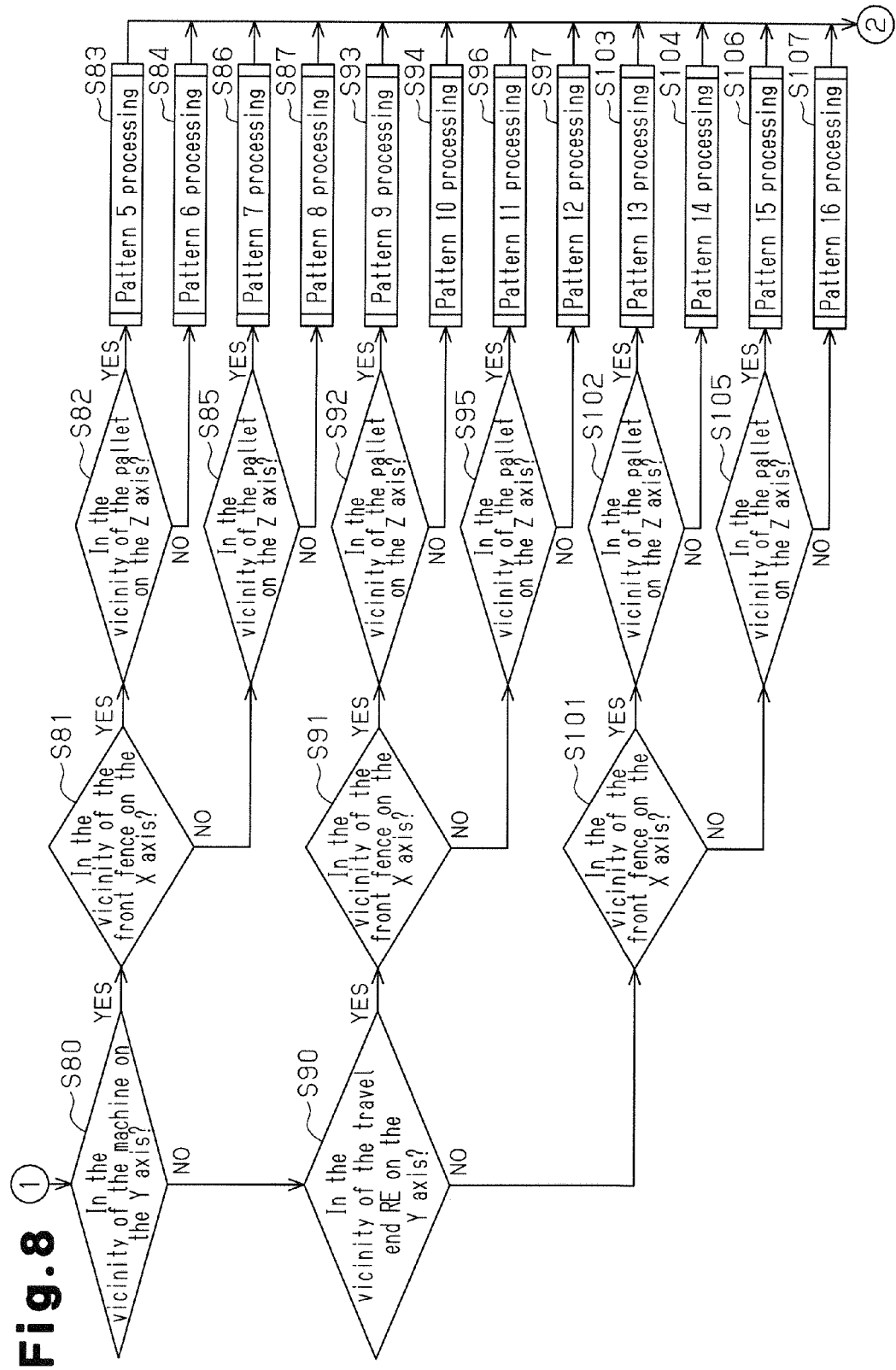
FIG. 8 is a flowchart of a program activated by a one-touch button.
Figure 9:
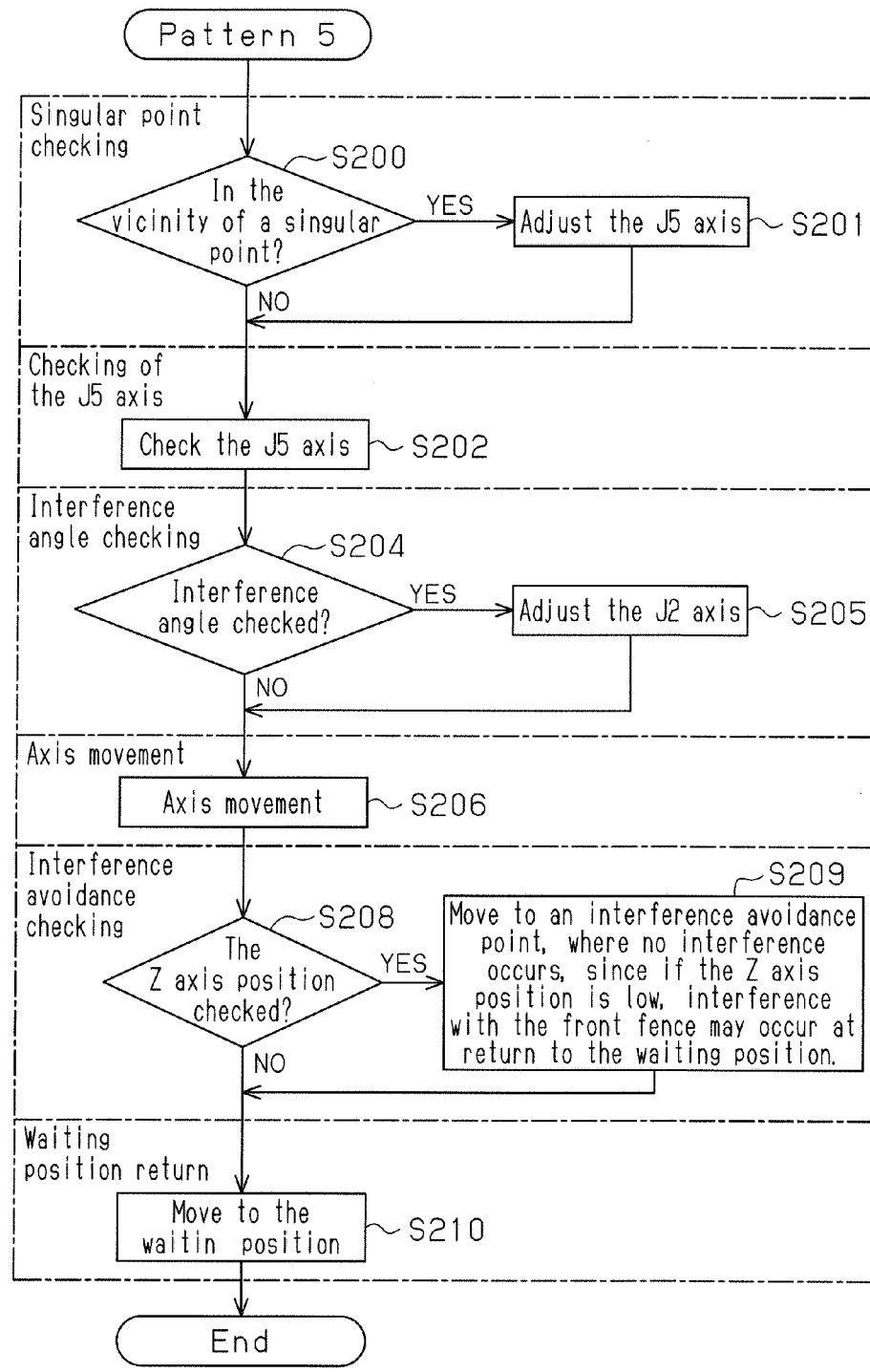
FIG. 9 is a flowchart of pattern 5.

Next, an operation of the NC machine tool system will be described by referring to the flowcharts of FIGS. 7 to 9.

Figure 2:
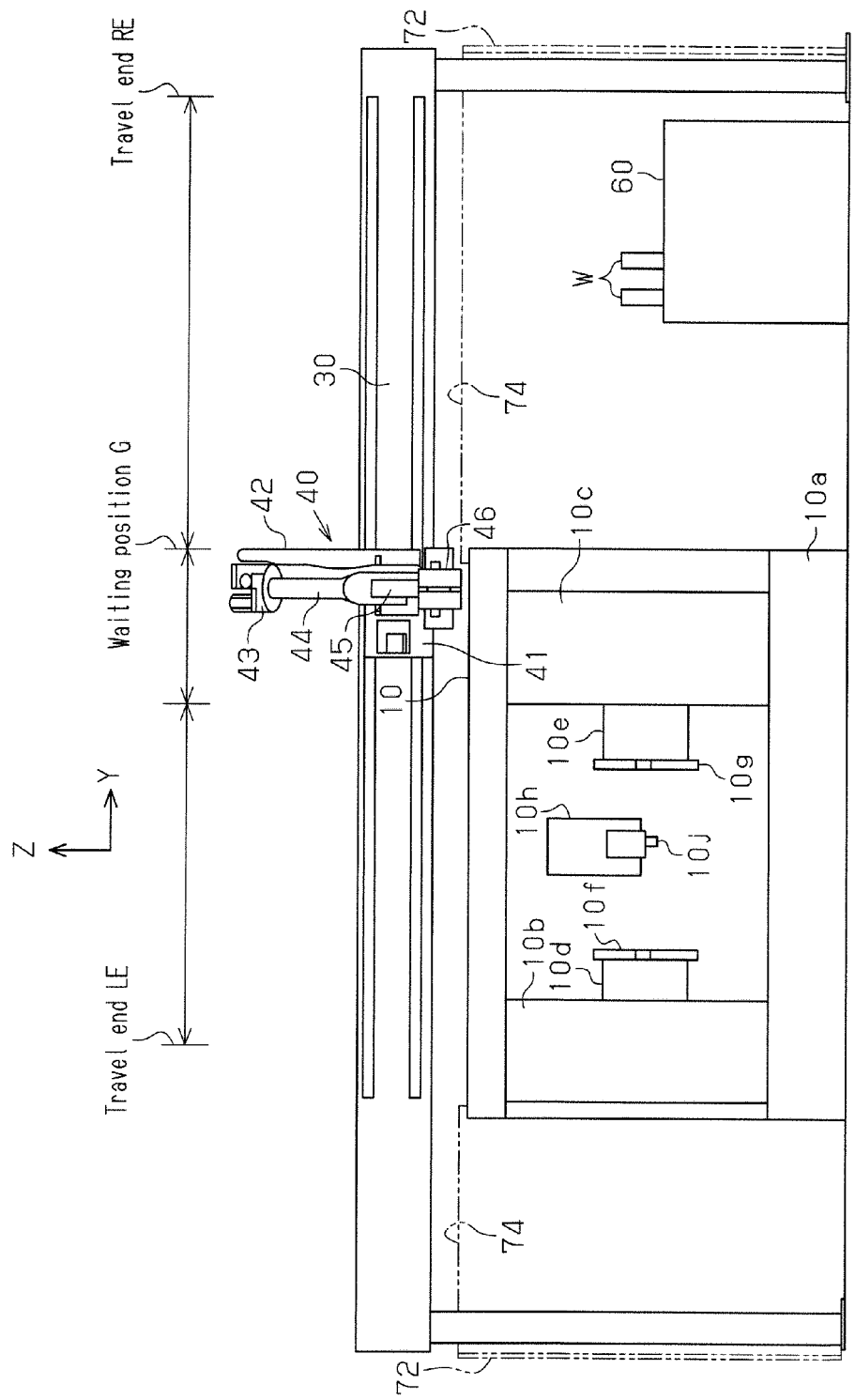
FIG. 2 is a front view of the NC machine tool system with a front fence removed.
Figure 3:
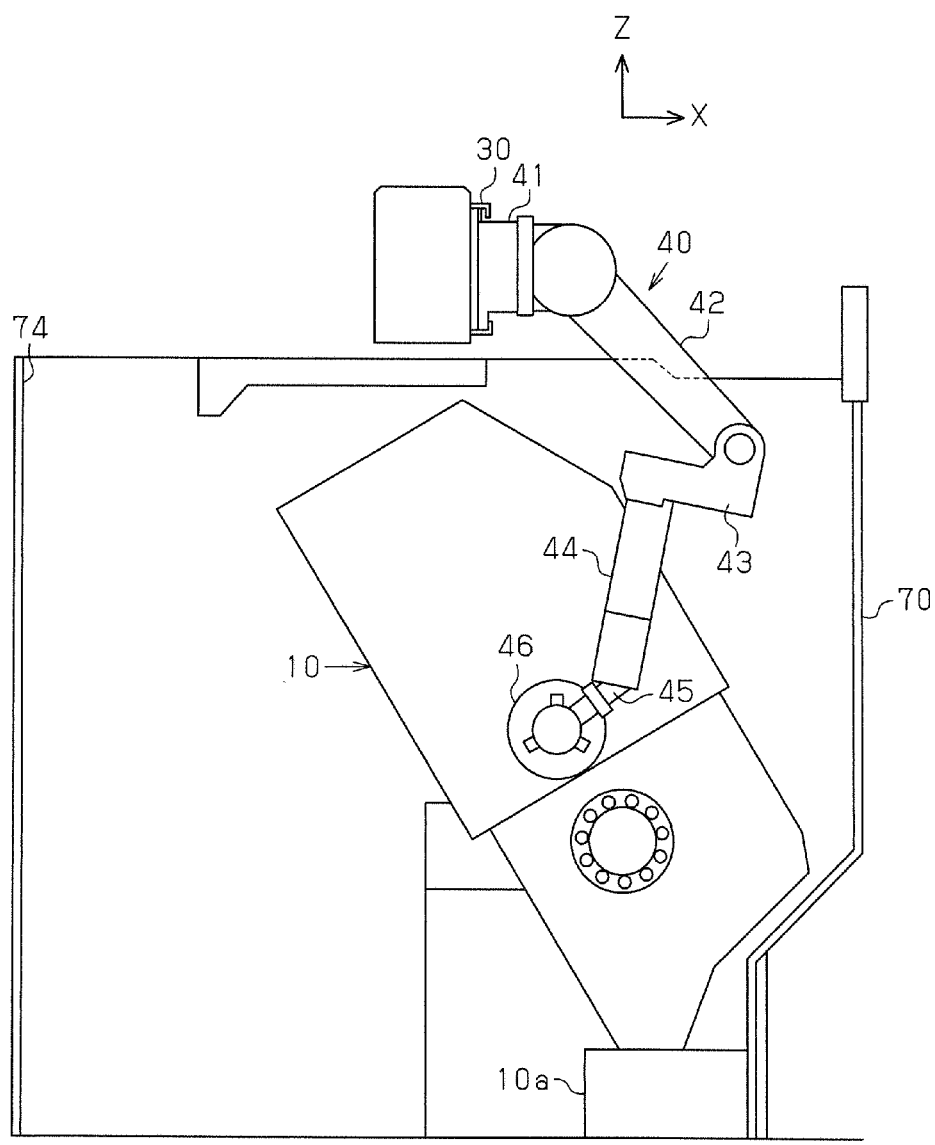
FIG. 3 is a side view of a multi-joint robot moved into the machine tool.

The waiting position return program executed in this embodiment is a program by which the multi-joint robot 40 is returned to its waiting position G. As shown in FIG. 2, the waiting position G is set above an end of the NC machine tool 10 facing the pallet 60. The waiting position return program is stored in the memory 450, and upon activation, read by the CPU 410 and stored in the RAM 440.

To return the multi-joint robot 40 to its waiting position, the operator, when working in the vicinity of the machine tool, operates the switch key 22c on the first operation panel 22. When working in the vicinity of the pallet 60, the operator operates the switch key 24c on the second operation panel 24. When either the switch key 22c or 24c is operated, the first operation panel 22 or the second operation panel 24 outputs a signal for program activation, which is input into the interface 160 of the NC controller 20. The signal for program activation is then input into the CPU 410 of the robot controller 50 through the communication interface 170 and the communication interface 470. The CPU 410 activates the waiting position return program based on the signal for program activation.

Figure 7:
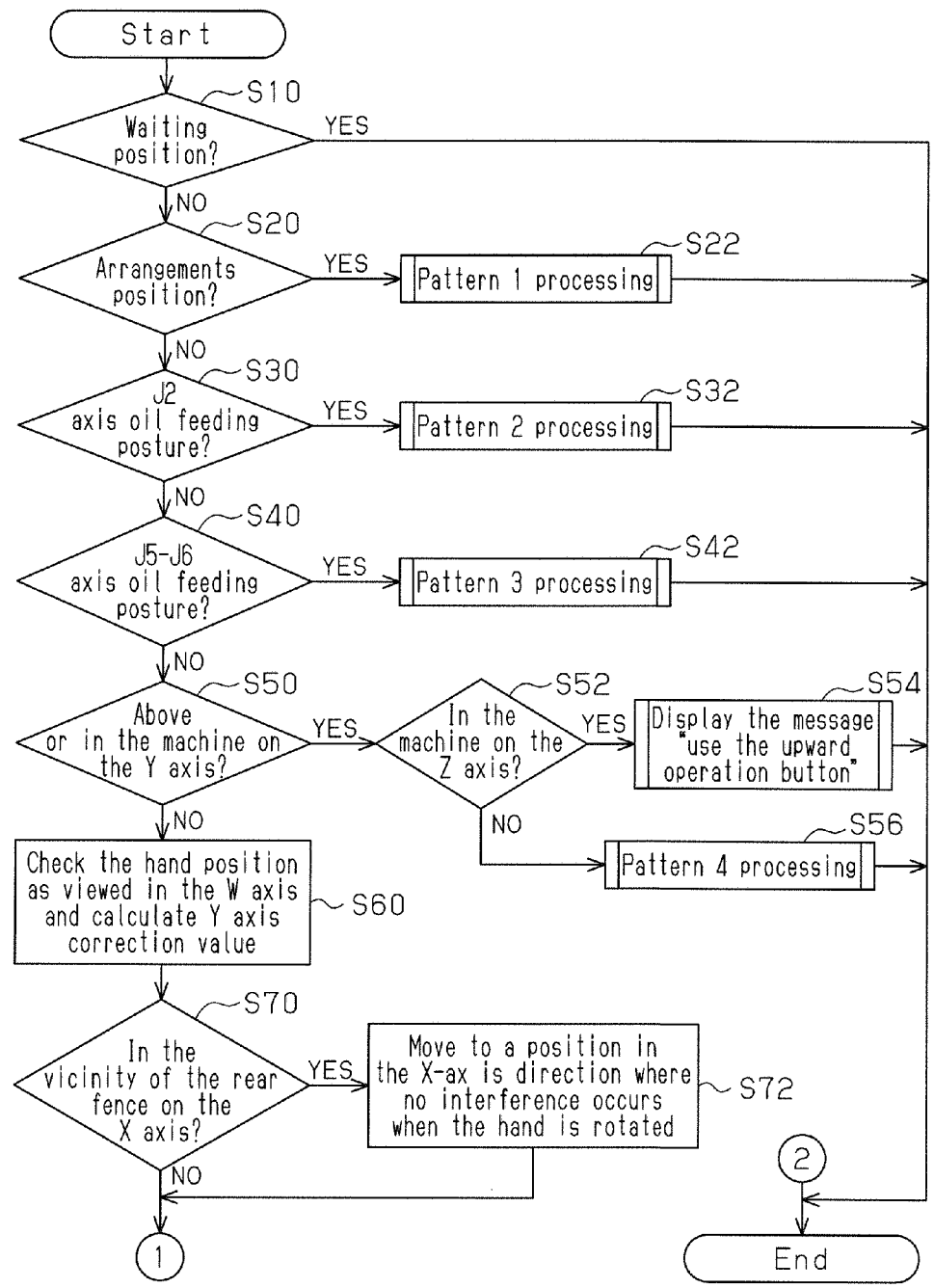
FIG. 7 is a flowchart of a program activated by a one-touch button.
Figure 12:
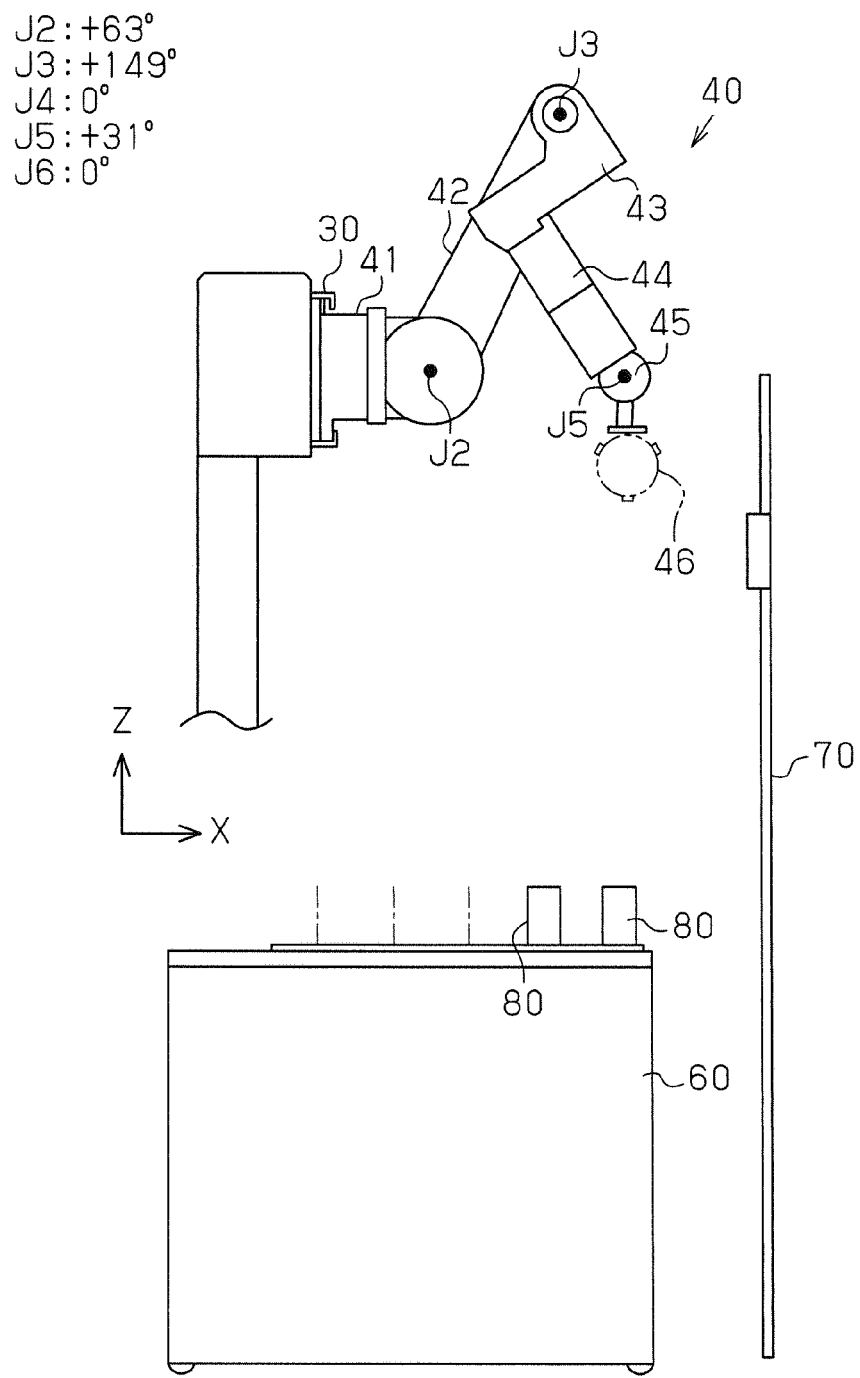
FIG. 12 is a side view of the multi-joint robot taking a waiting posture at a waiting position.

As shown in FIG. 7, at S10, the CPU 410 determines whether the positions and postures of all of the J1 to J6 axes correspond to the positions and postures of the multi-joint robot 40 returned to its waiting position G shown in FIGS. 2 and 12. The positions and postures of the multi-joint robot 40 returned to its waiting position G are set in the program in advance. Thus, the CPU 410 determines whether all of the J1 to J6 axes are at these positions and postures. When the multi-joint robot 40 turns into operation, the rotary encoders E1 to E6 detect the current position information of the respective J1 to J6 axis motors M1 to M6 at predetermined periods. Based on the current position information, the CPU 410 makes the determination at S10. When the positions and postures correspond to the positions and postures of the multi-joint robot 40 returned to its waiting position G, the CPU 410 ends the waiting position return program. When the multi-joint robot 40 is not at its waiting position G, the CPU 410 proceeds with the process to S20.

At S20, the CPU 410 determines whether the multi-joint robot 40 is at an arrangements position based on the current position information. The term "arrangements" generally refers to various kinds of preparation for the operator to turn the NC machine tool system into operation. In this embodiment, the term refers to the work of replacing the hand of the multi-joint robot. Thus, the arrangements position is the position of the multi-joint robot 40 where the operator replaces the hand of the multi-joint robot, as opposed to the waiting position. Specifically, the multi-joint robot 40 is turned into operation by a predetermined program, or moved by manual operation of the teaching box 26 to the arrangements position and takes the posture for the arrangements. At S20, the CPU 410 determines whether the multi-joint robot 40 is at the arrangements position. When the multi-joint robot 40 is at the arrangements position, the CPU 410 executes programmed, pattern 1 processing at S22.

In the pattern 1 processing, the CPU 410 makes a rotation control command to the axis motors so as to return the multi-joint robot 40 at the arrangements position to the waiting position G. The positions and postures of the arms and the robot hand 46 of the multi-joint robot 40 at the arrangements position are set in advance by the waiting position return program. Thus, the multi-joint robot 40 at the current position and posture is returned to its waiting position G. In this case, the distance between the waiting position G, which is the terminal, and the current position, which is based on the current position information, is divided into a plurality of sections. Then, the CPU 410 operably controls the robot hand 46 by linear interpolation, circular interpolation, or joint interpolation on a section basis so as to move the robot hand 46 to the waiting position G. When the multi-joint robot 40 moves through the sections to the waiting position G, the program of pattern 1 is set to avoid interference with the front fence 70, the rear fence 74, and the side fences 72. The positions and postures of the arms and the robot hand 46 of the multi-joint robot 40 returned to its waiting position G are the same as the positions and postures of them returned to the waiting position G in the processes described later, namely S32, S42, S56, S83, S84, S86, S87, S93, S94, S96, S97, S103, S104, S106, and S107.

After returning the multi-joint robot 40 to its waiting position G at S22, the CPU 410 ends the waiting position return program.

When at S20 the multi-joint robot 40 is not at the position and posture for the arrangements, the CPU 410 proceeds with the process to S30.

At S30, based on the current position information, the CPU 410 determines whether the multi-joint robot 40 is in the position and posture for the J2 axis oil feeding.

Here, the position and posture for the J2 axis oil feeding will be described.

Figure 16:
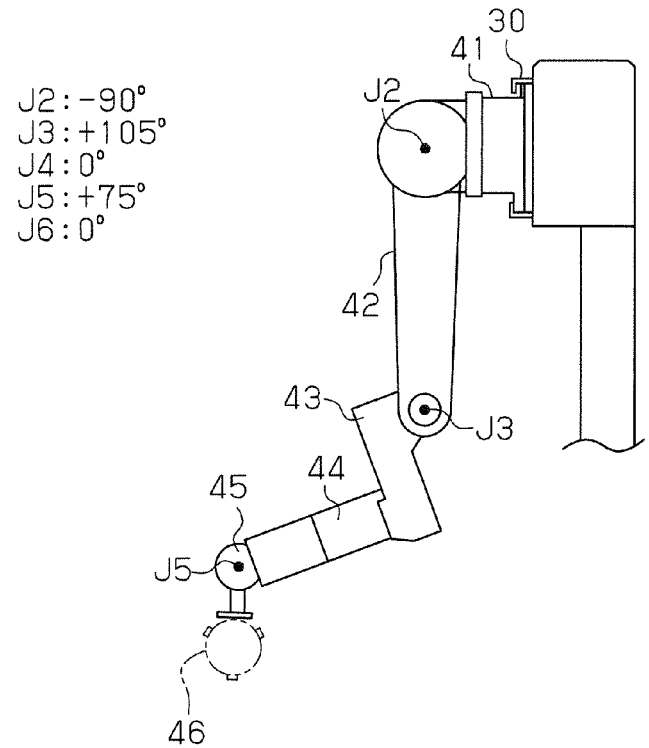
FIG. 16 is a side view of the multi-joint robot taking a J2 axis oil feeding posture.

FIG. 16 illustrates a J2 axis oil feeding posture of the multi-joint robot 40. In the J2 axis oil feeding posture, the J2 axis is −90 degrees, the J3 axis is +105 degrees, the J4 axis is zero degrees, the J5 axis is +75 degrees, and the J6 axis is zero degrees. Oil feeding is performed after the coordinate positions of the J2 to J6 axes are set at these angles. The position and posture for the J2 axis oil feeding are changed in accordance with the structure of the arms constituting the multi-joint robot 40.

When at S30 the multi-joint robot 40 is at the position and posture for the J2 axis oil feeding, the CPU 410 executes the pattern 2 processing at S32.

In the pattern 2 processing, the CPU 410 makes a rotation control command to the axis motors so as to return the multi-joint robot 40 at the J2 axis oil feeding position to the waiting position G. The positions and postures of the arms and the robot hand 46 of the multi-joint robot 40 at the J2 axis oil feeding position are set in advance by the waiting position return program. Thus, the multi-joint robot 40 at the position and posture for the J2 axis oil feeding is returned to the waiting position G. In this case, the distance between the waiting position G, which is the terminal, and the current position, which is based on the current position information, is divided into a plurality of sections. Then, the CPU 410 operably controls the robot hand 46 by linear interpolation, circular interpolation, or joint interpolation on a section basis so as to move the robot hand 46 to the waiting position G. When the multi-joint robot 40 moves through the sections to the waiting position G, the program of pattern 2 is set to avoid interference with the front fence 70, the rear fence 74, and the side fences 72.

After returning the multi-joint robot 40 to its waiting position G, the CPU 410 ends the waiting position return program. When at S30 the multi-joint robot 40 is not at the position and posture for the J2 axis oil feeding, the CPU 410 proceeds with the process to S40.

Figure 17:
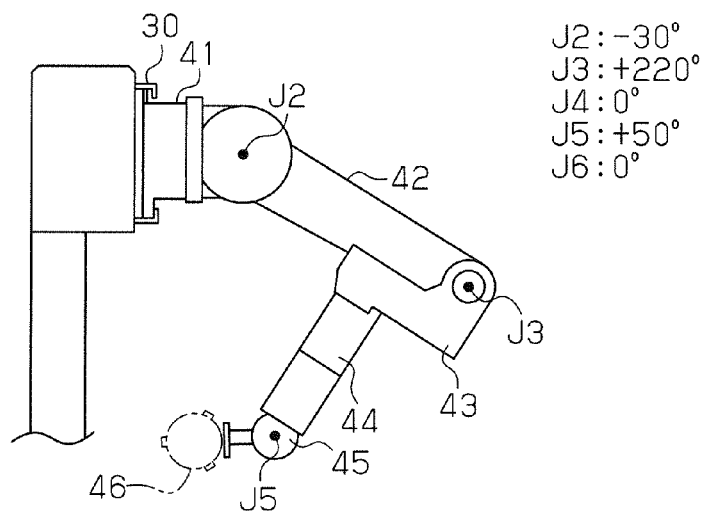
FIG. 17 is a side view of the multi-joint robot taking J5 and J6 axis oil feeding postures.

At S40, based on the current position information, the CPU 410 determines whether the multi-joint robot 40 is at the position and posture for the J5-J6 axis oil feeding shown in FIG. 17. In this embodiment, in the J5-J6 axis oil feeding posture, the J2 axis is −30 degrees, the J3 axis is +220 degrees, the J4 axis is zero degrees, the J5 axis is +50 degrees, and the J6 axis is zero degrees. Description of the position and posture for the J5-J6 axis oil feeding are changed in accordance with the structure of the arms constituting the multi-joint robot 40.

When at S40 the multi-joint robot 40 is at the position and posture for the J5-J6 axis oil feeding, the CPU 410 executes the pattern 3 processing at S42.

In the pattern 3 processing, the CPU 410 makes a rotation control command to the axis motors so as to return the multi-joint robot 40 at the J5-J6 axis oil feeding position to the waiting position G. The positions and postures of the arms and the robot hand 46 of the multi-joint robot 40 at the J5-J6 axis oil feeding position are set in advance by the waiting position return program. Thus, the multi-joint robot 40 at the current position and posture is returned to its waiting position G. In this case, the distance between the waiting position G, which is the terminal, and the current position, which is based on the current position information, is divided into a plurality of sections. Then, the CPU 410 operably controls the robot hand 46 by linear interpolation, circular interpolation, or joint interpolation on a section basis so as to move the robot hand 46 to the waiting position G. When the multi-joint robot 40 moves through the sections to the waiting position G, the program of pattern 3 is set to avoid interference with the front fence 70, the rear fence 74, and the side fences 72.

After returning the multi-joint robot 40 to its waiting position G, the CPU 410 ends the waiting position return program. When at S40 the multi-joint robot 40 is not at the position and posture for the J5-J6 axis oil feeding, the CPU 410 proceeds with the process to S50.

At S50, based on the current position information, the CPU 410 determines whether the robot hand 46 of the multi-joint robot 40 is above or in the machine. Specifically, the CPU 410 determines whether the robot hand 46 is positioned within a range in the Y-axis direction in the area that the NC machine tool 10 occupies. In the following description, the NC machine tool 10 will occasionally be referred to as the machine. The multi-joint robot 40 travels within the range between the travel ends LE and RE of the gantry rail 30. The CPU 410 determines whether the robot hand 46 is positioned within the range between the travel ends LE and RE in the area that the NC machine tool 10 occupies.

When at S50 the CPU 410 determines that the robot hand 46 is on the machine, the CPU 410 proceeds with the process to S52. At S52, the CPU 410 determines whether the robot hand 46 is positioned in the machine in the Z-axis direction, that is, in the NC machine tool 10. As used herein, "in the machine" denotes the case where the robot hand 46 enters the NC machine tool 10 to attach or detach a work piece 80 to or from the chucks 10f and 10g. The Z axis coordinate value is a threshold by which to determine whether the robot hand 46 enters the NC machine tool 10, and is input in advance.

When the current position information (the Z axis coordinate value) of the robot hand 46 on the Z axis is equal to or less than the threshold, the CPU 410 determines that the robot hand 46 is positioned in the machine, and proceeds with the process to S54. When the Z axis coordinate value is in excess of the threshold, the CPU 410 determines that the robot hand 46 is not positioned in the machine, and proceeds with the process to S56.

At S54, the CPU 410 causes the display device 22a of the first operation panel 22 and the display device 24a of the second operation panel 24 to display a warning indicating that the robot hand 46 is positioned in the machine, and thus no operation is available by the waiting position return program and operation using some other operation key is necessary. Specifically, the CPU 410 causes the display devices 22a and 24a to display "Use the upward operation button". After causing the display devices 22a and 24a to display this warning, the CPU 410 ends the waiting position return program.

In this case, the operator operates the buttons 22d and 24d respectively on the keyboards 22b and 24b for robot upward operation. When these buttons are operated, an upward command signal is input from the first operation panel 22 into the interface 160 of the NC controller 20. Then, the upward command signal is input into the CPU 410 of the robot controller 50 through the communication interface 170 and the communication interface 470. Based on the upward command signal, the CPU 410 activates an additionally prepared inner-machine upward program.

By the inner-machine upward program, the positions of the tool spindle unit 10h and a work piece spindle head 10c in the machine are checked. Then, processes similar to the processes of the waiting position return program are executed to move the robot hand 46 upward while avoiding interference with the unit.

When at S52 the robot hand 46 is not positioned in the machine, the CPU 410 proceeds with the process to S56.

When the process proceeds from S52 to S56, the robot hand 46 is not positioned in the machine but positioned above the NC machine tool 10, and the pattern 4 processing is executed.

In the pattern 4 processing, the CPU 410 makes a rotation control command to the axis motors so as to return the multi-joint robot 40 positioned above the NC machine tool 10 to the waiting position G. In this case, since the robot hand 46 is positioned above the NC machine tool 10, a significantly limited number of postures is expected. This ensures that the path to the waiting position G, which is the terminal, can be prepared in advance as a program of a plurality of sections with avoidance of interference with any interfering substance. Then, the CPU 410 operably controls the robot hand 46 by linear interpolation, circular interpolation, or joint interpolation on a section basis so as to move the robot hand 46 to the waiting position G. When the multi-joint robot 40 moves through the sections to the waiting position G, the program of pattern 4 is also set to avoid interference with the front fence 70, the rear fence 74, and the side fences 72. After returning the multi-joint robot 40 to its waiting position G, the CPU 410 ends the waiting position return program.

When at S50 the CPU 410 determines that the robot hand 46 is not on the machine, the CPU 410 proceeds with the process to S60. When all of the determinations made in S10, S20, S30, S40, and S50 are "NO", the multi-joint robot 40 is handling the work piece 80 on the pallet 60.

The following processes are under the assumption that the multi-joint robot 40 is in its handling operation of the work piece 80 on the pallet 60.

At S60, the CPU 410 checks the current position of the robot hand 46 as viewed in a W axis, and calculates a Y axis correction value. The W axis is a rotation axis about the X axis.

As shown in FIG. 11, the robot hand 46 is made up of the loading hand 46b and the unloading hand 46c. The robot hand 46 makes a 180-degree rotation about the J6 axis to switch to the hand to use. When the position of the robot hand 46 written in the program is read, or when a command of the position of the robot hand 46 is made, selection is made between tool coordinate systems to switch to the hand to which the instruction is intended. Specifically, there are two kinds of tool coordinate systems, namely the loading hand coordinate system and the unloading coordinate system. When the current position of the robot hand 46 is read on the loading hand coordinate system, a coordinate value of a reference portion 47 of the loading hand 46b is indicated. When the current position of the robot hand 46 is read on the unloading coordinate system, a coordinate value of a reference portion 47 of the unloading hand 46c is indicated.

In the waiting position return program, the robot hand 46 does not perform loading or unloading. Instead, a command is made for the operation of returning the robot hand 46 to the waiting position. Thus, the loading hand coordinate system is primarily used to read the position of the robot hand 46 and to make a command of the position of the robot hand 46. Hence, "the current position of the robot hand 46" or "coordinate value" as used in this specification refers to a value on the loading hand coordinate system. However, the angle of the J6 axis of the robot hand 46 when the waiting position return program is in operation is not determined yet. Thus, the coordinate value that has been read cannot be used as it is to calculate the distance between the robot hand 46 and the interfering substance. For example, using only the X axis coordinate value to calculate the distance in the X-axis direction, using only the Y axis coordinate value to calculate the distance in the Y-axis direction, and using only the Z axis coordinate value to calculate the distance in the Z-axis direction do not result in the correct distance between the robot hand 46 and the interfering substance. When a sufficient distance exists between the robot hand 46 and the interfering substance, making such a clearance that enables the robot hand 46 to make a 360-degree rotation about the J6 axis ensures determination of interference between the robot hand 46 and the interfering substance. However, when the distance between the robot hand 46 and the interfering substance is not sufficient, a Y axis correction is performed and then determination of interference in the Y-axis direction is made.

The W axis coordinate value of the robot hand 46 refers to the rotation angle of a vector about the X axis. The vector has its base point located at the center coordinate of a circle that the reference portion 47 draws when the robot hand 46 makes a 360-degree rotation on the J6 axis. The vector has its end point located at the coordinate of the reference portion 47. The W axis coordinate value is used to roughly determine whether the loading hand 46b is oriented upward, downward, rightward, or leftward. With the posture of the robot remaining unchanged, the J6 axis alone is rotated to orient the loading hand 46 leftward, and the Y axis coordinate value of the reference portion 47 in this state is calculated. The error between the coordinate value thus calculated and the current Y axis coordinate value is stored as a Y axis correction value and used for interference determination that follows.

After calculating the Y axis correction value at S60, the CPU 410 at S70 determines whether the robot hand 46 is positioned in the vicinity of the rear fence 74 on the X axis. That is, the CPU 410 determines whether interference with the rear fence 74 occurs if the robot hand 46 makes a rotation about the J4 to J6 axes at the X axis coordinate value where the robot hand 46 is currently positioned.

When the X axis coordinate value of the robot hand 46 is closer to the rear fence 74 than a determination X axis coordinate value stored in advance in the memory 450 is to the rear fence 74, the CPU 410 determines that the robot hand 46 is positioned in the vicinity of the rear fence and that rotating the robot hand 46 about the J4 to J6 axes may possibly result in interference with the rear fence 74.

When at S70 the CPU 410 determines that the robot hand 46 is positioned in the vicinity of the rear fence 74 in the X-axis direction, then the CPU 410 at S72 rotates the robot hand 46 on the J2 axis, the J3 axis, or the J5 axis to move the robot hand 46 to a position in the X-axis direction where no interference with the rear fence 74 occurs. In this respect, which axis to move among the J2 axis, the J3 axis, and the J5 axis, and which axes to combine can be conveniently determined.

After the processing at S72, or when determining at S70 that the robot hand 46 is not positioned in the vicinity of the rear fence 74 in the X-axis direction, the CPU 410 proceeds with the process to S80.

At S80, the CPU 410 adds the Y axis correction value calculated at S60 to the Y axis coordinate value (resulting in a "corrected Y axis coordinate value"). Based on the corrected Y axis coordinate value, the CPU 410 determines whether the robot hand 46 is positioned in the vicinity of the machine on the Y axis. This determination processing includes the processing of determining whether the corrected Y axis coordinate value is closer to the machine than a machine vicinity determination threshold HS1 is to the machine. The machine vicinity determination threshold HS1 is stored in advance in the memory 450. When the corrected Y axis coordinate value is closer to the machine than the machine vicinity determination threshold HS1 is to the machine, the CPU 410 determines that the robot hand 46 is positioned in the vicinity of the machine. The machine vicinity determination threshold HS1 is a coordinate value for determination on the Y axis. When the CPU 410 determines that the robot hand 46 is positioned in the vicinity of the machine, then the CPU 410 proceeds with the process to S81. When the CPU 410 determines that the robot hand 46 is not positioned in the vicinity of the machine, then the CPU 410 proceeds with the process to S90.

At S81, based on the current position information, the CPU 410 determines whether the robot hand 46 is positioned in the vicinity of the front fence 70 in the X-axis direction. This determination processing includes the processing of determining whether the X axis coordinate value is closer to the front fence 70 than a front-fence vicinity determination threshold MS1 is to the front fence 70. The front-fence vicinity determination threshold MS1 is stored in advance in the memory 450. When the current X axis coordinate value is closer to the front fence 70 than the front-fence vicinity determination threshold MS1 is to the front fence 70, the CPU 410 determines that the current position of the robot hand 46 is in the vicinity of the front fence 70. The front-fence vicinity determination threshold MS1 is a coordinate value for determination on the X axis.

When the CPU 410 determines that the current position of the robot hand 46 is in the vicinity of the front fence 70, then the CPU 410 proceeds with the process to S82.

At S82, based on the current position information, the CPU 410 determines whether the robot hand 46 is positioned in the vicinity of the pallet 60 in the Z-axis direction. This determination processing includes the processing of determining whether the Z axis coordinate value is closer to the pallet 60 than a pallet vicinity determination threshold PS1 is to the pallet 60. The pallet vicinity determination threshold PS1 is stored in advance in the memory 450. When the current Z axis coordinate value is closer to the pallet 60 than the pallet vicinity determination threshold PS1 is to the pallet 60, the CPU 410 determines that the current position of the robot hand 46 is in the vicinity of the pallet 60. The pallet vicinity determination threshold PS1 is a coordinate value for position determination in the Z-axis direction. The pallet vicinity determination threshold PS1 takes into consideration the case where a work piece 80 exists on the pallet 60. Thus, the pallet vicinity determination threshold PS1 is such a value that the robot hand 46 does not interfere with the work piece 80.

When the CPU 410 determines that the current position of the robot hand 46 is in the vicinity of the pallet, then the CPU 410 proceeds with the process to S83. At S83, the CPU 410 executes return processing of pattern 5 to move the multi-joint robot 40 to its waiting position G, and ends this flowchart.

When at S82 the CPU 410 determines that the current position of the robot hand 46 is not in the vicinity of the pallet 60, the CPU 410 proceeds with the process to S84. Then, the CPU 410 executes return processing of pattern 6 to move the multi-joint robot 40 to its waiting position G, and ends this flowchart.

When at S81 the CPU 410 determines that the current position of the robot hand 46 is not in the vicinity of the front fence 70, the CPU 410 proceeds with the process to S85. The processing at S85 is similar to the processing at S82. When at S85 the CPU 410 determines that the Z axis coordinate value of the robot hand 46 is in the vicinity of the pallet, the CPU 410 proceeds with the process to S86. Then, the CPU 410 executes return processing of pattern 7 and ends this flowchart. At S85, when the CPU 410 determines that the Z axis coordinate value of the robot hand 46 is not in the vicinity of the pallet, the CPU 410 proceeds with the process to S87. Then, the CPU 410 executes return processing of pattern 8 and ends this flowchart.

At S90, based on the current position information, the CPU 410 determines whether the robot hand 46 is positioned in the vicinity of the travel end RE on the Y axis. This determination processing includes the processing of determining whether the corrected Y axis coordinate value is closer to the travel end RE than a travel-end vicinity determination threshold HS2 is to the travel end RE. The travel-end vicinity determination threshold HS2 is stored in advance in the memory 450.

When the corrected Y axis coordinate value of the robot hand 46 is closer to the travel end RE than the travel-end vicinity determination threshold HS2 is to the travel end RE, the CPU 410 determines that the robot hand 46 is positioned in the vicinity of the travel end RE. Specifically, the CPU 410 makes a "YES" determination. The travel-end vicinity determination threshold HS2 is a coordinate value for determination on the Y axis. When the CPU 410 determines that the robot hand 46 is positioned in the vicinity of the travel end RE, the CPU 410 proceeds with the process to S91. When the CPU 410 determines that the robot hand 46 is not positioned in the vicinity of the travel end RE, the CPU 410 proceeds with the process to S101.

Processes at and later than S91 will be described.

The determination processing at S91, S92, and S95 are similar to the determination processes at S81, S82, and S85, which are after the "YES" determination at S80, and therefore will not be elaborated here.

When the CPU 410 makes a "YES" determination at S91 and a "YES" determination at S92, the CPU 410 at S93 executes the pattern 9 processing, and ends this flowchart. When at S92 the CPU 410 makes a "NO" determination, the CPU 410 at S94 executes the pattern 10 processing, and ends this flowchart. When the CPU 410 makes a "NO" determination at S91 and a "YES" determination at S95, the CPU 410 at S96 executes the pattern 11 processing, and ends this flowchart. When at S95 the CPU 410 makes a "NO" determination, the CPU 410 at S97 executes the pattern 12 processing, and ends this flowchart.

Processes at and later than S101 will be described.

The determination processes at S101, S102, and S105 are similar to the determination processes at S81, S82, and S85, which are after the "YES" determination by the CPU 410 at S80, and therefore will not be elaborated here.

When the CPU 410 makes a "YES" determination at S101 and a "YES" determination at S102, the CPU 410 at S103 executes the pattern 13 processing, and ends this flowchart. When at S102 the CPU 410 makes a "NO" determination, the CPU 410 at S104 executes the pattern 14 processing, and ends this flowchart. When the CPU 410 makes a "NO" determination at S101 and makes a "YES" determination at S105, the CPU 410 at S106 executes the pattern 15 processing, and ends this flowchart. When at S105 the CPU 410 makes a "NO" determination, the CPU 410 at S107 executes the pattern 16 processing, and ends this flowchart.

Figure 13A:
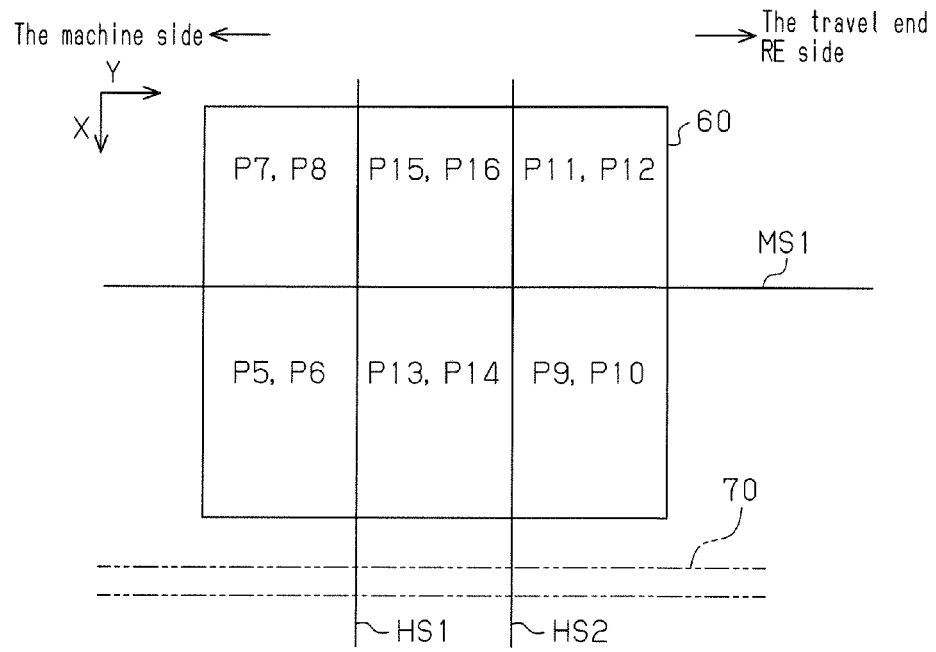
FIGS. 13(a) and 13(b) are diagrams schematically illustrating the positions of the robot hand at which the pattern 5 to 16 processes are executed.
Figure 13B:
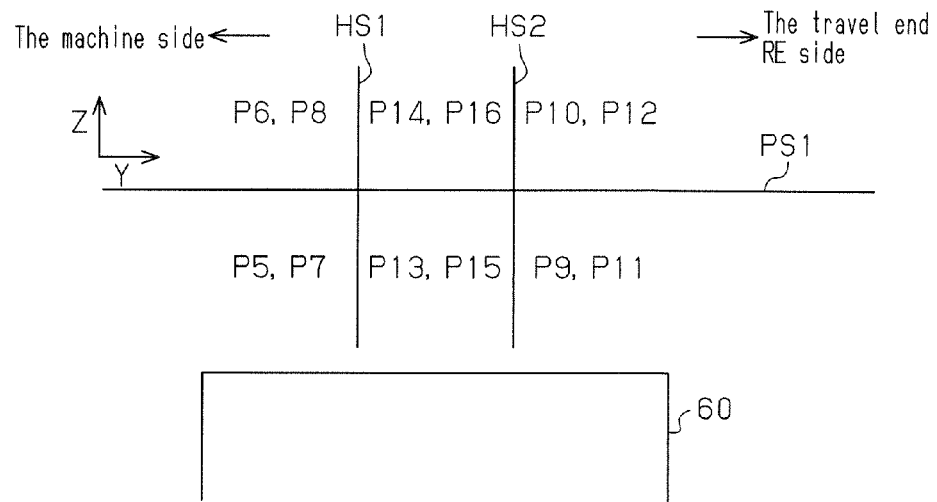

Referring to FIGS. 13(a) and 13(b), description will be made with regard to the positions of the robot hand 46 determined in the above-described processes at S80, S81, S82, S85, S90, S91, S92, S95, S101, S102, and S105.

As shown in FIGS. 13(a) and 13(b), the positions of the robot hand 46 targeted in the pattern 5 to 16 processes are indicated by the pattern numbers preceded by "P". FIG. 13(a) illustrates regions defined by the machine vicinity determination threshold HS1, the travel-end vicinity determination threshold HS2, and the front-fence vicinity determination threshold MS1. FIG. 13(b) illustrates regions defined by the machine vicinity determination threshold HS1, the travel-end vicinity determination threshold HS2, and the pallet vicinity determination threshold PS1. When the robot hand 46 is positioned in any of the regions, the processing among the pattern 5 to 16 processes corresponding to the region is executed.

Next, the pattern 5 to 16 processes will be described by referring to FIGS. 9 and 10.

As shown in FIG. 10, patterns 5 to 16 are a combination of all or some of processing items including singular point checking, checking of the J5 axis, interference angle checking, axis movement, interference avoidance checking, and waiting position return. First, description will be made with regard to the pattern 5 processing, where all of the processing items are combined, by referring to the flowchart of FIG. 9. The other pattern 6 to 16 processes will be described by comparison with the items executed in the pattern 5 processing.

In the pattern 5 processing, the CPU 410 sequentially executes the processes of singular point checking, checking of the J5 axis, interference angle checking, axis movement, interference avoidance checking, and waiting position return.

In the singular point checking, the CPU 410 at S200 determines whether the posture of the J6 axis unit 45 is in the vicinity of a singular point based on the current rotation angle of the J5 axis. Specifically, the CPU 410 confirms whether the value of the J5 axis is in the range of −5 degrees to +5 degrees. When the posture of the J6 axis unit 45 is not in the vicinity of a singular point, the CPU 410 proceeds with the process to S202. When the CPU 410 determines that the posture of the J6 axis unit 45 is in the vicinity of a singular point, the CPU 410 at S201 rotates the J5 axis to move the J6 axis unit 45 away from the vicinity of a singular point. After adjusting the angle of the J5 axis, the CPU 410 proceeds with the process to S202.

When the robot is positioned at a singular point, that is, in a singular posture, this means that an infinite number of postures exist associated with the designated rectangular coordinate value. This disables operation of the robot. In view of this, the CPU 410 determines whether the current position of the robot hand 46 is in the vicinity of a singular point, and prevents the robot hand 46 from being positioned at the singular point in the operations that follow.

In the checking of the J5 axis, the CPU 410 at S202 checks the J5 axis, which corresponds to the angle of the wrist of the robot hand 46, to calculate a coordinate value of the Z axis that ensures that the robot hand 46 will not interfere with the pallet 60 even if the wrist is rotated, specifically, if the J4 axis and the J6 axis are rotated. The CPU 410 stores the calculated coordinate value of the Z axis in the RAM 440 for later use. Next, in the interference angle checking, the CPU 410 determines whether the members constituting the multi-joint robot 40 interfere with each other. Specifically, when the J2 axis arm 42 and the J3 axis arm 44 come close to one another, they tend to interfere with one another in the operations that follow.

In view of this, the CPU 410 at S204 confirms whether the angle (interference angle) defined by the J2 axis arm 42 and the J3 axis arm 44 is equal to or less than an interference angle threshold, based on the current rotation angle of each of the J2 axis and the J3 axis. When the interference angle is equal to or less than the interference angle threshold, the CPU 410 determines that there is a possibility of interference, and proceeds with the process to S205. At S205, the CPU 410 drives the J2 axis motor M2 to rotate the J2 axis, thereby making the interference angle in excess of the interference angle threshold. The CPU 410 may also drive the J3 axis motor M3, instead of the J2 axis motor M2, to rotate the J3 axis casing 43, thereby making the interference angle in excess of the interference angle threshold. At S204, when the interference angle is not equal to or less than the interference angle threshold, the CPU 410 proceeds with the process to S206.

The axis movement at S206 is processing of moving the robot hand 46 to an intermediate position between the current position and the waiting position G. First, prior to description of movement to the intermediate position, setting of the intermediate position will be described. When the robot hand 46 is positioned in the vicinity of at least one of the front fence 70, the pallet 60, the travel end RE, and the machine, a position that is apart from these elements by a predetermined distance is assumed to be an intermediate position. Specifically, when the robot hand 46 is close only to the front fence 70, a predetermined value is added to the X axis coordinate value of the current position of the robot hand 46, and the sum is assumed to be the X axis coordinate value of the intermediate position. The predetermined value to be added to the X axis coordinate value is a value to which a "NO" determination is made at S81 by comparison with the front-fence vicinity determination threshold MS1.

The Y axis coordinate value and the Z axis coordinate value of the intermediate position are assumed to be the corrected Y axis coordinate value and the Z axis coordinate value of the current position of the robot hand 46. When the robot hand 46 is close only to the pallet 60, the X axis coordinate value and the Y axis coordinate value of the intermediate position are the X axis coordinate value and the corrected Y axis coordinate value of the current position of the robot hand 46. The CPU 410 makes the value calculated in the checking of the J5 axis the Z axis coordinate value of the intermediate position.

When the robot hand 46 is close only to the machine or the travel end RE, the X axis coordinate value and the Z axis coordinate value of the intermediate position are the X axis coordinate value and the Z axis coordinate value of the current position of the robot hand 46. The Y axis coordinate value of the intermediate position is a sum of a predetermined value added to the corrected Y axis coordinate value of the robot hand 46. The predetermined value added to the corrected Y axis coordinate value when the robot hand 46 is close only to the machine or the travel end RE is a value to which a "NO" determination is made at S80 by comparison with the machine vicinity determination threshold HS1, or a value to which a "NO" determination is made at S90 by comparison with the travel-end vicinity determination threshold HS2.

Next, description will be made with regard to setting of the intermediate position when the robot hand 46 is close to at least two of the front fence 70, the machine, the travel end RE, and the pallet.

When the robot hand 46 is close to at least two of the above-described elements, predetermined values are added to the current coordinate values on the coordinate axes in the vicinity of the respective elements, similarly to the case where the robot hand 46 is close to one element. The sums are assumed to be the coordinate values of the intermediate position.

When the robot hand 46 is not in the vicinity of the above-described interfering substances, the coordinate values of the current position of the robot hand 46 are employed, as they are, as the coordinate values of the intermediate position. When the current position of the robot hand 46 is in the vicinity of the pallet 60, the value calculated in the checking of the J5 axis is assumed to be the Z axis coordinate value of the intermediate position. When the robot hand 46 is not in the vicinity of any of the interfering substances, the current position of the robot hand 46 is the coordinate values of the intermediate position. In this case, the CPU 410 does not execute movement to the intermediate position.

After setting the intermediate position in the above-described manner, in the axis movement at S206, the CPU 410 controls the robot hand 46 to move from the current position to the intermediate position. The intermediate position is set when interference is possible with any of the interfering substances. Thus, movement to the intermediate position is controlled by linear interpolation.

The next interference avoidance checking is as to whether there is a possibility of the robot hand 46 interfering with the front fence 70 when the multi-joint robot 40 in the state where the robot hand 46 is at the intermediate position is moved to the waiting position G by joint interpolation.

The CPU 410 at S208 executes the interference avoidance checking based on a comparison between the Z axis coordinate value of the intermediate position and a determination threshold on the Z axis. The determination threshold is a value obtained using a test value or the like and is stored in the memory 450.

Figure 15:
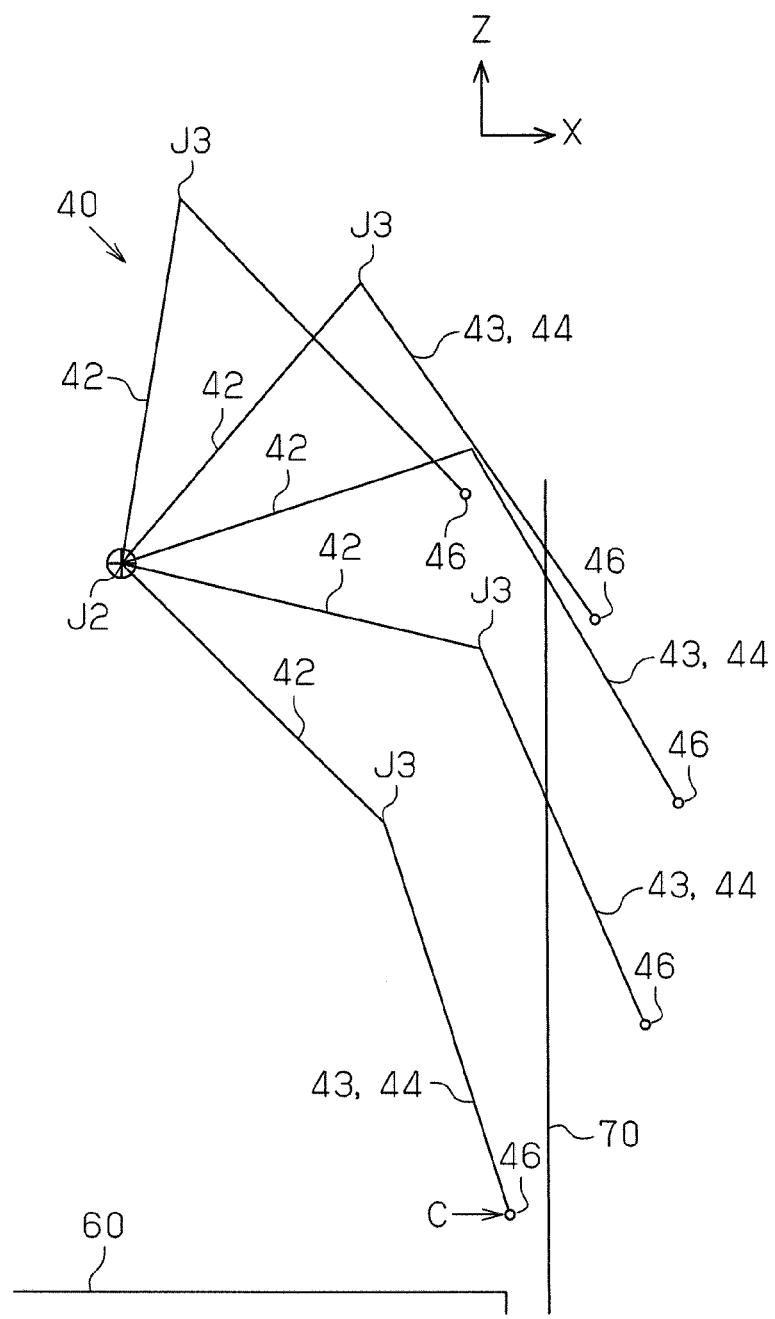
FIG. 15 is a diagram schematically illustrating a movement of the multi-joint robot with interference with the front fence.

FIG. 15 illustrates a track of movement of the multi-joint robot 40 when the Z axis coordinate value of an intermediate position C is equal to or less than the determination threshold and when joint interpolation is executed on the J2 axis and the J3 axis before the multi-joint robot 40 returns from the intermediate position C to the waiting position G. As shown in FIG. 15, the robot hand 46 protrudes beyond the front fences 70, interfering with the front fence 70. When the multi-joint robot 40 is moved from the intermediate position C to the waiting position G by joint interpolation, the J2 axis and the J3 axis move over a wide range by joint interpolation, creating a possibility of the robot hand 46 interfering with the front fence 70. To take this case into consideration, it is necessary to move the robot hand 46 to an interference avoidance point K, described later.

The position and posture of the multi-joint robot 40 when returned to its waiting position G are as shown in FIG. 12. The posture has rotation angles of +63 degrees on the J2 axis, +149 degrees on the J3 axis, zero degrees on the J4 axis, +31 degrees on the J5 axis, and zero degrees on the J6 axis. Thus, in the joint interpolation for movement to the waiting position at S210 described later, the current rotation angles of the axes are controlled with the above-described rotation angles at the waiting position G as target rotation angles.

When at S208 the Z axis coordinate value of the intermediate position C is equal to or less than the determination threshold on the Z axis, the CPU 410 proceeds with the process to S209, where the CPU 410 moves the robot hand 46 to the interference avoidance point K. Then, the CPU 410 proceeds with the process to S210 to execute the waiting position return processing. The interference avoidance point K is above the intermediate position C on the Z axis and is at a position without interference with the front fence 70 when the multi-joint robot 40 is moved from the interference avoidance point K to the waiting position G by joint interpolation.

Figure 14:
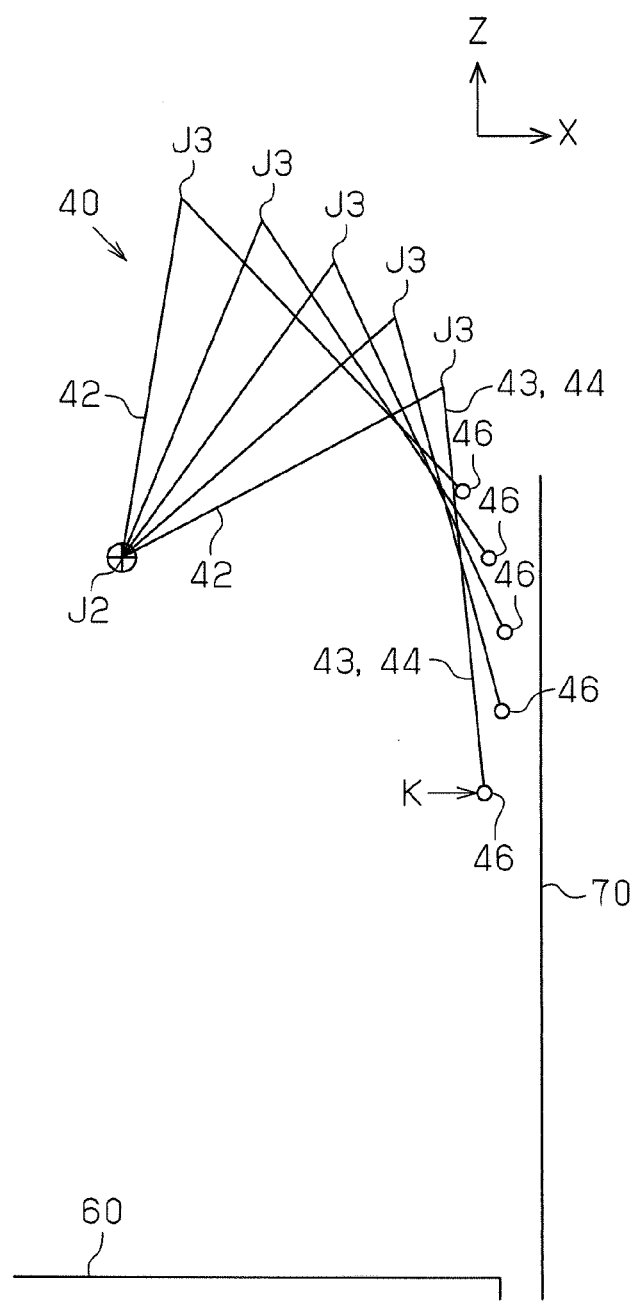
FIG. 14 is a diagram schematically illustrating a movement of the multi-joint robot without interference with the front fence.

FIG. 14 illustrates a track of movement of the multi-joint robot 40 when the multi-joint robot 40 returns from the interference avoidance point K to the waiting position G while joint interpolation is executed on the J2 axis and the J3 axis. As shown in FIG. 14, the robot hand 46 moves upward along the Z axis without interference with the front fence 70. Specifically, the interference avoidance point K is positioned further upward than the determination threshold on the Z axis. This makes the track of movement of the J2 axis and the J3 axis smaller and eliminates interference of the robot hand 46 with the front fence 70.

In the next waiting position return, the CPU 410 at S210 returns the multi-joint robot 40 from the intermediate position C or the interference avoidance point K to the waiting position G by joint interpolation.

Next, patterns 9 and 13 will be described by referring to FIG. 10.

As shown in FIG. 10, patterns 9 and 13 are similar to pattern 5 in that all of the processing items are executed, namely the singular point checking, the checking of the J5 axis, the interference angle checking, the axis movement, the interference avoidance checking, and the waiting position return.

In patterns 6, 10, and 14, the checking of the J5 axis is omitted and the other processing items are executed, namely the singular point checking, the interference angle checking, the axis movement, the interference avoidance checking, and the waiting position return. With the checking of the J5 axis omitted in patterns 6, 10, and 14, the CPU 410 proceeds with the process to S204 when a "NO" determination is made at S200 or after S201 in the flowcharts of patterns 6, 10, and 14, as opposed to the flowchart of FIG. 9.

As shown in FIG. 13(*b*), in patterns 6, 10, and 14, the robot hand 46 is positioned above the pallet vicinity determination threshold PS1. This provides a sufficient height for avoiding interference of the robot hand 46 with the pallet 60 even if the wrist of the robot hand 46 is rotated with checking the J5 axis, which corresponds to the angle of the wrist of the robot hand 46. For this reason, the checking of the J5 axis is omitted in patterns 6, 10, and 14.

Patterns 7, 11, and 15 are similar to pattern 5 in that all of the processing items are executed, namely the singular point checking, the checking of the J5 axis, the interference angle checking, the axis movement, the interference avoidance checking, and the waiting position return. The flowcharts of patterns 7, 11, and 15 are similar to the flowchart of FIG. 9.

Patterns 8 and 12 are different from pattern 5 in that the singular point checking, the checking of the J5 axis, and the interference angle checking are omitted, and the axis movement, the interference avoidance checking, and the waiting position return are executed.

In patterns 8 and 12, no singular points occur in the return from the current position to the waiting position G, and therefore, the singular point checking is omitted. Also as shown in FIG. 13(*b*), the robot hand 46 is positioned above the pallet vicinity determination threshold PS1. That is, a sufficient height is ensured for avoiding interference of the robot hand 46 with the pallet 60 even if the wrist of the robot hand 46 is rotated by checking the J5 axis, which corresponds to the angle of the wrist of the robot hand 46. For this reason, the checking of the J5 axis is omitted. Also in patterns 8 and 12, there is no possibility of the members interfering with each other in the return from the current position to the waiting position G. For this reason, the interference angle checking is omitted.

Pattern 16 is different from pattern 5 in that the singular point checking, the checking of the J5 axis, the interference angle checking, and the axis movement are omitted, and the interference avoidance checking and the waiting position return are executed. In pattern 16, the singular point checking, the checking of the J5 axis, and the interference angle checking are omitted for similar reasons to the reasons in patterns 8 and 12. Also as shown in FIGS. 13(*a*) and 13(*b*), the robot hand 46 is not positioned in the vicinity of any of the interfering substances. This means that the current position is the intermediate position C, which is equivalent to completion of the axis movement in pattern 5 to pattern 15. For this reason, the axis movement is omitted in pattern 16. Thus, in pattern 16, it is only necessary to execute the interference avoidance checking and the waiting position return.

Thus, when either the switch key 22*c* or the switch key 24*c* is turned on, the moving path is selected in accordance with the position and posture of the multi-joint robot 40 at the time when either the switch key 22*c* or the switch key 24*c* is turned on. Along the selected moving path, the robot hand 46 is controlled to move to the waiting position G. Patterns 1 to 16 are set in the programs corresponding to the moving paths to be selected.

The first operation panel 22 and the second operation panel 24 of the NC machine tool system are respectively provided with the switch keys 22*c* and 24*c* through which to execute the waiting position return program stored in the memory 450 and to turn the multi-joint robot 40 into operation. This ensures that when the operator turns on the switch keys 22*c* and 24*c* respectively of the first operation panel 22 and the second operation panel 24, the waiting position return program is executed to turn the multi-joint robot 40 into operation. This ensures safe operation of the multi-joint robot 40 even for an operator who operates the multi-joint robot 40 for the first time.

The waiting position return program is set to operate on a rectangular coordinate system used for the NC machine tool 10. This ensures that the multi-joint robot 40 is operated on a rectangular coordinate system used for the NC machine tool 10. This facilitates understanding of how to operate the multi-joint robot 40 for an operator used to operating the NC machine tool 10.

The waiting position return program is set in the following manner. When the waiting position G (target position posture) of the multi-joint robot 40 is set and when the multi-joint robot 40 is moved toward its waiting position G (target position posture), the moving path is selected in accordance with the position and posture of the multi-joint robot 40 at the time when the switch key 22c or 24c is turned on. Along the selected moving path, the multi-joint robot 40 is moved. The robot controller 50 controls the multi-joint robot 40 in accordance with a program. This saves the operator the need to operate the multi-joint robot 40 in accordance with the position and posture of the multi-joint robot 40.

The pallet 60 for a workpiece 80 is disposed next to the NC machine tool 10. The multi-joint robot 40 is movable between the NC machine tool 10 and the pallet 60. The pallet 60 and the NC machine tool 10 are surrounded by the front fence 70, the side fences 72, and the rear fence 74 (safety fences). In the waiting position return program, the waiting position G (target position posture) of the multi-joint robot 40 is set. The waiting position return program is set to move the multi-joint robot 40 along a moving path selected in accordance with the position and posture of the multi-joint robot 40 at the time when the switch key 22c or 24c is turned on. The waiting position return program is also set to move the multi-joint robot 40 toward the waiting position G (target position posture) while avoiding interference with the front fence 70, the side fences 72, and the rear fence 74 (safety fences).

The robot controller 50 controls the multi-joint robot 40 in accordance with the waiting position return program. This ensures that when the waiting position return program is executed, the moving path is selected in accordance with the position and posture of the multi-joint robot 40 at the time when the switch key 22c or 24c is turned on, and that the multi-joint robot 40 is moved toward its waiting position G (target position posture) while avoiding interference with the front fence 70 (safety fence). This saves the operator the need to operate the multi-joint robot 40 in accordance with the position and posture of the multi-joint robot 40 while avoiding interference with the front fence 70 (safety fence).

The first operation panel 22 is disposed in a vicinity of the NC machine tool 10, and the second operation panel 24 is disposed in a vicinity of the pallet 60. The operation panels 22 and 24 are respectively provided with the switch keys 22c and 24c through which to execute the waiting position return program. This ensures that when the multi-joint robot 40 is positioned in the vicinity of the pallet 60, turning on the switch key 24c of the second operation panel 24 executes the waiting position return program. When the multi-joint robot 40 is positioned in the vicinity of the NC machine tool 10, operating the first operation panel 22 executes the program. Thus, depending on whether the multi-joint robot 40 is positioned in the vicinity of the pallet 60 or the NC machine tool 10, the operator can operate the switch means on whichever operation panel closer to the pallet 60 or NC machine tool 10. This ensures that a common program to turn the multi-joint robot 40 into operation is executed.

While in this embodiment the pallet 60 is disposed on the right side of the NC machine tool 10, the pallet 60 may be disposed on the left side of the NC machine tool 10.

In this embodiment, the multi-joint robot 40 may be a 6-axis multi-joint robot with the J1 axis which is a traveling axis rendered a rotation axis.

In this embodiment, the multi-joint robot 40 may be other than a 6-axis multi-joint robot and may be a 7-axis or more-axis multi-joint robot.

The invention claimed is:

1. A numerical control (NC) machine tool system comprising:
   a numerical control (NC) machine tool;
   an operation panel for the NC machine tool;
   a multi-joint robot disposed above the NC machine tool;
   program storing means for storing a program by which the multi-joint robot is operated; and
   a robot controller configured to control the multi-joint robot in accordance with the program,
   wherein a waiting position of the multi-joint robot is set in the program,
   wherein the program is one of a plurality of programs prepared in advance, the plurality of programs corresponding to positions of the multi-joint robot when switch means is turned on,
   wherein the operation panel comprises the switch means configured to be operated to execute the program stored in the program storing means and to operate the multi-joint robot,
   wherein one program among the plurality of programs is selected in accordance with a position and posture of the multi-joint robot when the switch means is turned on, and
   wherein the robot controller is configured to control the multi-joint robot to move along a moving path set in the selected program so as to return the multi-joint robot to the waiting position from a current position of the multi-joint robot.

2. The NC machine tool system according to claim 1, wherein a workpiece pallet is disposed next to the NC machine tool,
   wherein the multi-joint robot is movable between the NC machine tool and the pallet,
   wherein the pallet and the NC machine tool are surrounded by a safety fence, and
   wherein the robot controller is configured to move the multi-joint robot along the moving path set in the selected program while avoiding interference with the safety fence.

3. The NC machine tool system according to claim 1, wherein the operation panel comprises:
   a first operation panel disposed in a vicinity of the NC machine tool, and
   a second operation panel disposed in a vicinity of the pallet,
   wherein the first and second operation panels each comprise the switch means to be operated so as to execute the program.

4. The NC machine tool system according to claim 1, wherein the program is set on a rectangular coordinate system used for the NC machine tool.

5. The NC machine tool system according to claim 2, wherein the operation panel comprises:
   a first operation panel disposed in a vicinity of the NC machine tool, and
   a second operation panel disposed in a vicinity of the pallet, and
   wherein the first and second operation panels each comprise the switch means to be operated so as to execute the program.

6. The NC machine tool system according to claim 2, wherein the program is set on a rectangular coordinate system used for the NC machine tool.

7. The NC machine tool system according to claim 3, wherein the program is set on a rectangular coordinate system used for the NC machine tool.

8. The NC machine tool system according to claim 5, wherein the program is set on a rectangular coordinate system used for the NC machine tool.

* * * * *